US012611839B2

(12) United States Patent
Nguyen Van Nuoi et al.

(10) Patent No.: US 12,611,839 B2
(45) Date of Patent: Apr. 28, 2026

(54) POROUS STRUCTURES AND METHOD OF MAKING

(71) Applicant: SAINT-GOBAIN CERAMICS & PLASTICS, INC., Worcester, MA (US)

(72) Inventors: Patrick Nguyen Van Nuoi, Cavaillon (FR); Mark Hampden-Smith, Chelmsford, MA (US); Franceline Villermaux, Avignon (FR); Paul W. Rehrig, Sterling, MA (US); Katelyn Dagnall, Cambridge, MA (US)

(73) Assignee: SAINT-GOBAIN CERAMICS & PLASTICS, INC., Northborough, MA (US)

( * ) Notice: Subject to any disclaimer, the term of this patent is extended or adjusted under 35 U.S.C. 154(b) by 258 days.

(21) Appl. No.: 18/326,990

(22) Filed: May 31, 2023

(65) Prior Publication Data

US 2023/0382075 A1 Nov. 30, 2023

Related U.S. Application Data

(60) Provisional application No. 63/365,574, filed on May 31, 2022.

(51) Int. Cl.
| | |
|---|---|
| *B32B 3/18* | (2006.01) |
| *B01D 39/14* | (2006.01) |
| *B32B 1/08* | (2006.01) |

(52) U.S. Cl.
CPC ............... *B32B 3/18* (2013.01); *B01D 39/14* (2013.01); *B32B 1/08* (2013.01); *B01D 2239/0407* (2013.01); *B01D 2239/0478* (2013.01); *B01D 2239/1208* (2013.01)

(58) Field of Classification Search
CPC ......... B32B 3/18; B32B 1/08; B32B 2597/00; B32B 3/085; B32B 2255/26; B01D 39/14; B01D 2239/0407; B01D 2239/0478; B01D 2239/1208
See application file for complete search history.

(56) References Cited

U.S. PATENT DOCUMENTS

| | | | |
|---|---|---|---|
| 7,780,833 B2 | 8/2010 | Hawkins et al. | |
| 8,597,393 B2 | 12/2013 | Morita et al. | |
| 8,728,317 B2 | 5/2014 | Nelemans et al. | |
| 9,908,087 B2 | 3/2018 | Jerman et al. | |
| 10,399,039 B2 | 9/2019 | Steen | |
| 10,661,209 B2 | 5/2020 | Way | |
| 11,311,841 B2 | 4/2022 | Steen et al. | |
| 11,325,073 B2 * | 5/2022 | Ghaffour ................. C02F 1/442 |
| 2002/0139122 A1 | 10/2002 | Alvin et al. | |
| 2019/0111399 A1 | 4/2019 | Ghaffour et al. | |
| 2020/0038798 A1 | 2/2020 | Greenbank et al. | |
| 2020/0188854 A1 | 6/2020 | Roderick et al. | |
| 2021/0016232 A1 | 1/2021 | Liu | |

OTHER PUBLICATIONS

Search Report from PCT Application No. PCT/US2023/067725 mailed Sep. 14, 2023, 4 pages.

* cited by examiner

*Primary Examiner* — Michael C Miggins
(74) *Attorney, Agent, or Firm* — Abel Schillinger, LLP; Adrian Lawrence

(57) ABSTRACT

A porous body includes a substrate comprising a longitudinal axis along a length L of the substrate and wherein the substrate defines a spiral shape when viewed in a plane perpendicular to the longitudinal axis, and a plurality of discrete spacer particles attached to the substrate.

20 Claims, 24 Drawing Sheets

301 — Obtaining a substrate

303 — Forming particles on the substrate

305 — Manipulating the substrate to form a porous body

307 — Coating the body

Width (Y)

Thickness (Z)

Length (X)

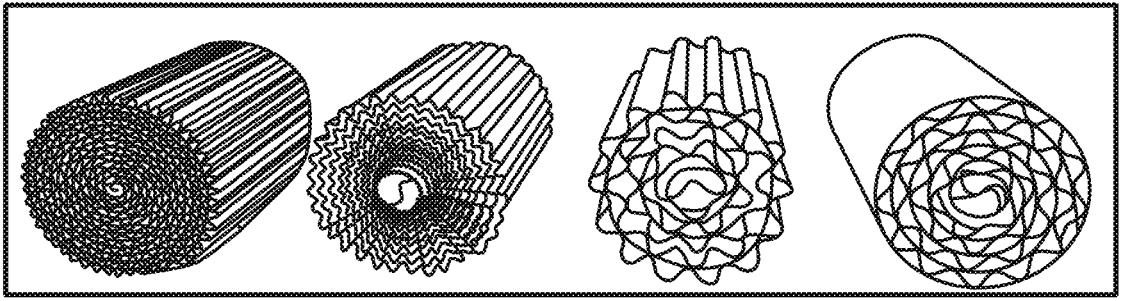
*FIG. 5*
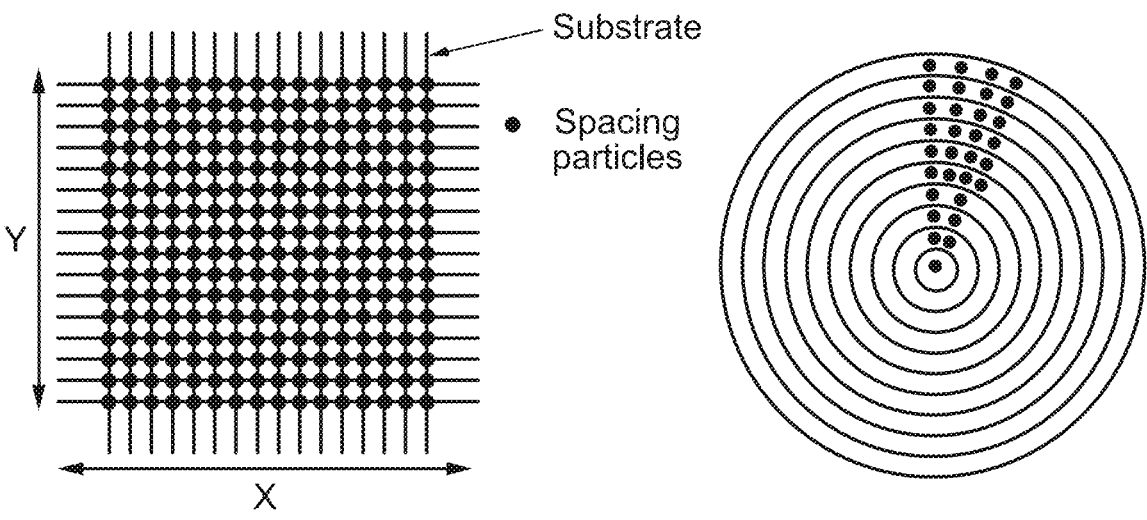
*FIG. 6A*                    *FIG. 6B*

850

853

851

857

855

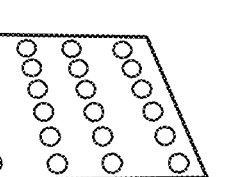
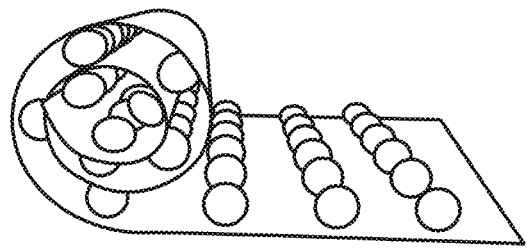
FIG. 12A            FIG. 12B
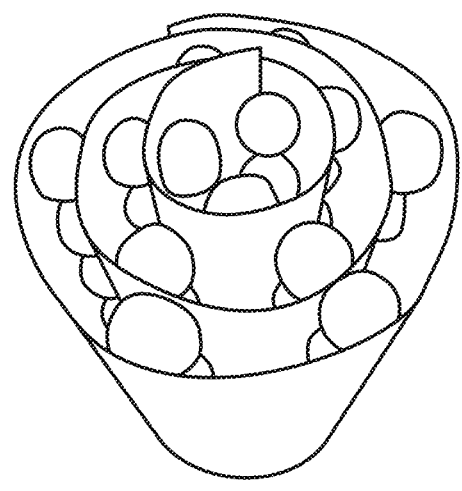
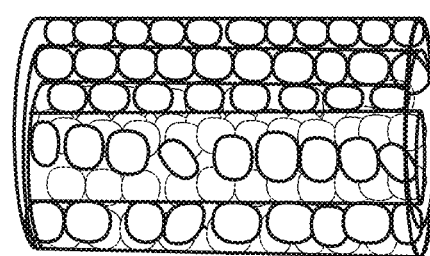
FIG. 12C            FIG. 12D

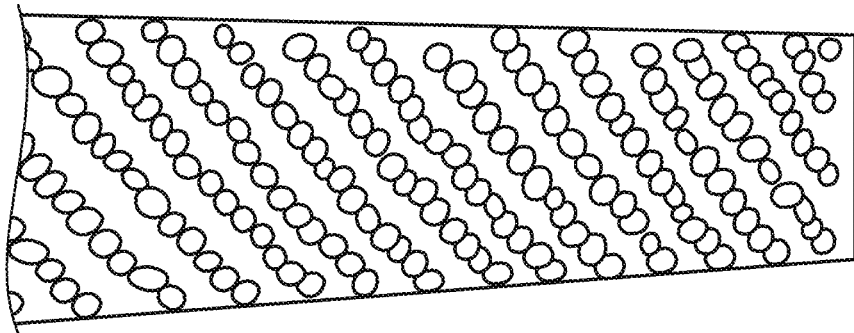
*FIG. 13A*
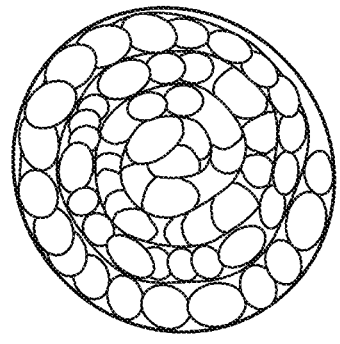
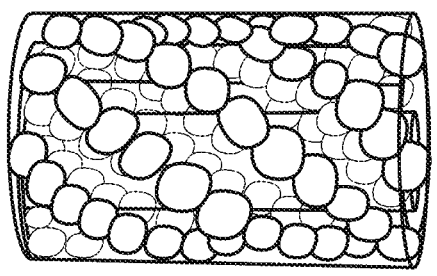
*FIG. 13B*            *FIG. 13C*

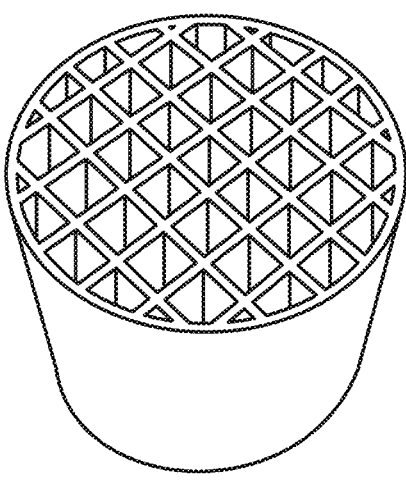
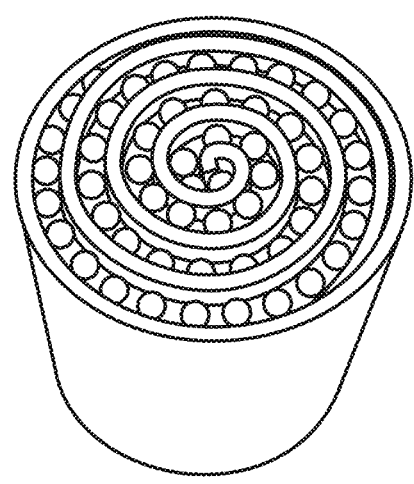
*FIG. 14A*                    *FIG. 14B*
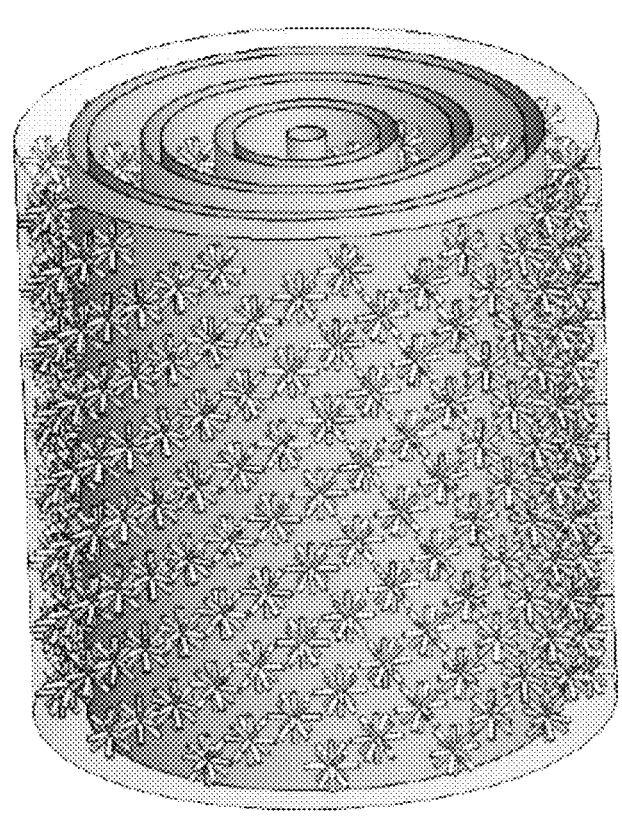
*FIG. 14C*

POROUS STRUCTURES AND METHOD OF MAKING

CROSS-REFERENCE TO RELATED APPLICATION(S)

This application claims priority under 35 U.S.C. § 119(e) to U.S. Provisional Patent Application No. 63/365,574, filed May 31, 2022, by Patrick NGUYEN VAN NUOI et al., entitled "POROUS STRUCTURES AND METHOD OF MAKING," which is assigned to the current assignee hereof and incorporated herein by reference in its entirety for all purposes.

BACKGROUND

Field Of The Disclosure

The following is directed to porous structures and methods for making the same.

Description of the Related Art

Porous structures made from ceramic and metallic bodies are known. Ceramic bodies are typically formed by conventional processes (e.g., extrusion, subtractive pore-forming processes, etc.). Some metallic bodies are formed by rolling a sheet of metal to form a corrugated structure defining channels therein. FIGS. 1 and 2 provide illustrations of conventionally formed products. The industry continues to demand improvements of porous structures.

BRIEF DESCRIPTION OF THE DRAWINGS

The present disclosure may be better understood, and its numerous features and advantages made apparent to those skilled in the art by referencing the accompanying drawings.

FIG. 5 includes an image of a plurality of different conventional, rolled, and corrugated metal filters having channels extending linearly through the body.

FIG. 6a includes a top-down view illustration of a planar substrate including a plurality of particles attached to at least one surface of the planar substrate.

FIG. 6b includes a side view illustration of a porous body formed by rolling the planar substrate including the plurality of particles.

FIGS. 12a, 12b, 12c and 12d include images of a sample made according to an embodiment using a first type of distribution of discrete spacer particles on a substrate to demonstrate the impact of the distribution on the flow path through the porous body.

FIGS. 13a, 13b, and 13c include images of a sample made according to an embodiment using a second type of distribution of discrete spacer particles on a substrate to demonstrate the impact of the distribution on the flow path through the porous body.

FIG. 14a includes a perspective view image of a conventional porous body formed via extrusion.

FIG. 14b includes a perspective view illustration of a porous body formed according to an embodiment.

FIG. 14c includes a perspective view illustration of a porous body formed according to an embodiment.

SUMMARY

Figure 1:
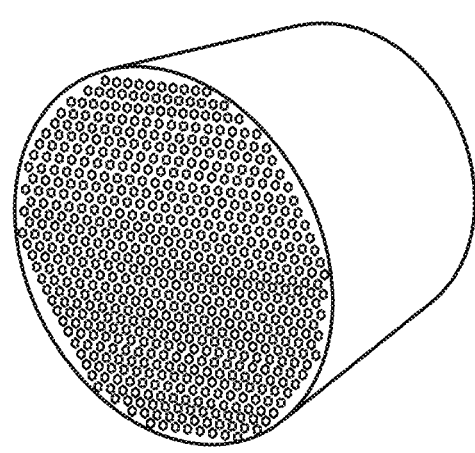
FIG. 1 includes an image of a conventional, extruded ceramic filter having channels extending linearly through the body.
Figure 2:
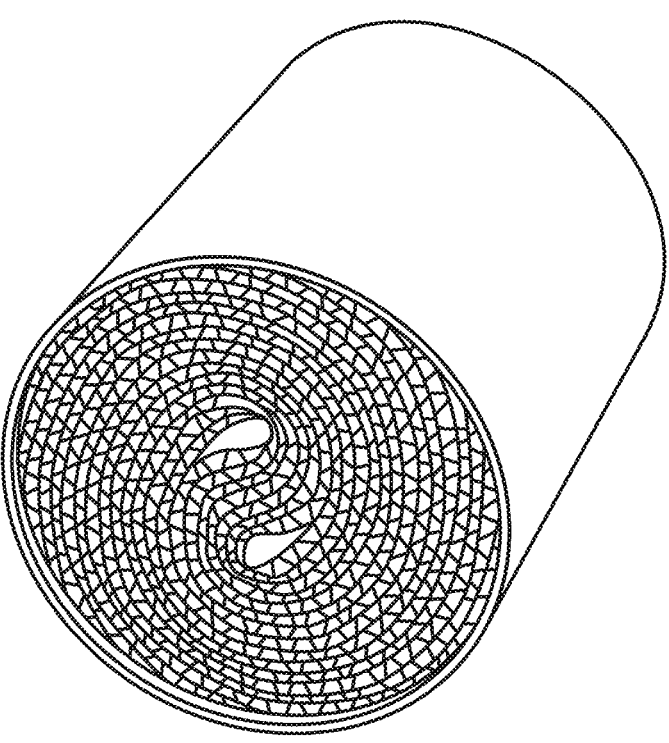
FIG. 2 includes an image of a conventional, rolled, and corrugated metal filter having channels extending linearly through the body.

According to a first aspect, a porous body includes an outer tubular structure having an inner surface and an outer surface, a first plurality of discrete spacer particles attached to the inner surface of the outer tubular structure, a first inner tubular structure having an inner surface and an outer surface wherein the outer surface of the first inner tubular structure abuts the first plurality of discrete spacer particles.

In an aspect, a porous body includes an outer tubular structure having an inner surface and an outer surface, a plurality of inner tubular structures each having an inner surface and an outer surface, a plurality of discrete spacer particles distributed within the porous body and a coating overlying at least a portion of a surface of the porous body, wherein the coating comprises metal organic frameworks (MOFs).

In another aspect, a porous body includes an outer tubular structure having an inner surface and an outer surface, a plurality of inner tubular structures each having an inner surface and an outer surface, a plurality of discrete spacer particles distributed within the porous body.

In another aspect, a porous body includes an outer tubular structure having an inner surface and an outer surface, a plurality of inner tubular structures each having an inner surface and an outer surface, a plurality of discrete spacer particles distributed within the porous body wherein each of the plurality of discrete spacer particles comprises an active material.

In still another aspect, a porous body includes an outer tubular structure having an inner surface and an outer surface, a plurality of inner tubular structures each having an inner surface and an outer surface, a plurality of discrete spacer particles distributed within the porous body; and wherein the porous body comprises an active material on at least a portion of the body.

In another aspect, a porous body includes an outer tubular structure having an inner surface and an outer surface, a plurality of inner tubular structures each having an inner surface and an outer surface, a plurality of discrete spacer particles distributed within the porous body wherein each of the plurality of discrete spacer particles comprises a multi-armed shape wherein the multi-armed shape forms a contact point with the outer tubular structure, the plurality of inner tubular structures or a combination thereof.

In another aspect, a porous body includes a substrate comprising a longitudinal axis along a length L of the substrate and wherein the substrate defines a spiral shape when viewed in a plane perpendicular to the longitudinal axis, a plurality of discrete spacer particles attached to the substrate.

In another aspect, a porous body includes a substrate comprising a longitudinal axis along a length L of the substrate and wherein the substrate defines a spiral shape when viewed in a plane perpendicular to the longitudinal axis, a plurality of discrete spacer particles attached to the substrate and a coating overlying at least a portion of a surface of the porous body, wherein the coating comprises metal organic frameworks (MOFs).

In still another aspect, a porous body includes a substrate comprising a longitudinal axis along a length L of the substrate and wherein the substrate defines a spiral shape when viewed in a plane perpendicular to the longitudinal axis, a plurality of discrete spacer particles attached to the substrate wherein each of the plurality of discrete spacer particles comprises an average solidity of at least 0.6 and not greater than 1.

In another aspect, a porous body includes a substrate comprising a longitudinal axis along a length L of the substrate and wherein the substrate defines a spiral shape when viewed in a plane perpendicular to the longitudinal axis, a plurality of discrete spacer particles attached to the substrate comprises an active material.

In still another aspect, a porous body includes a substrate comprising a longitudinal axis along a length L of the substrate and wherein the substrate defines a spiral shape when viewed in a plane perpendicular to the longitudinal axis, a plurality of discrete spacer particles attached to the substrate; and wherein the porous body comprises an active material on at least a portion of the body.

In still another aspect, a porous body includes a substrate comprising a longitudinal axis along a length L of the substrate and wherein the substrate defines a spiral shape when viewed in a plane perpendicular to the longitudinal axis, a plurality of discrete spacer particles attached to the substrate wherein each of the plurality of discrete spacer particles comprises a multi-armed shape wherein the multi-armed shape forms a contact point with the substrate.

DETAILED DESCRIPTION

The following is directed toward a porous article which may be used in the following applications: filtration, separation, heat and mass transfer, heterogeneous catalyst and catalyst carrier, air and gas purification and separation, carbon capture and conversion, volatile organic compound capture and conversion, de-humidification, hazardous fume abatement, liquid treatment including potable and waste water, liquid treatment and separation, chemical synthesis, petroleum refining, automobile catalytic conversion, fuel cell air purification, selective absorption and adsorption, reactors, ion extraction, selective (ion) transporting materials/membranes, lithium capture, packed bed adsorption, absorption, reaction, and separation, gas (e.g., $CO_2$, NOx, etc.) capture and/or conversion, and the like. The porous bodies may be used in pharmaceutical and/or biochemical and/or biomedical applications.

Figure 3:
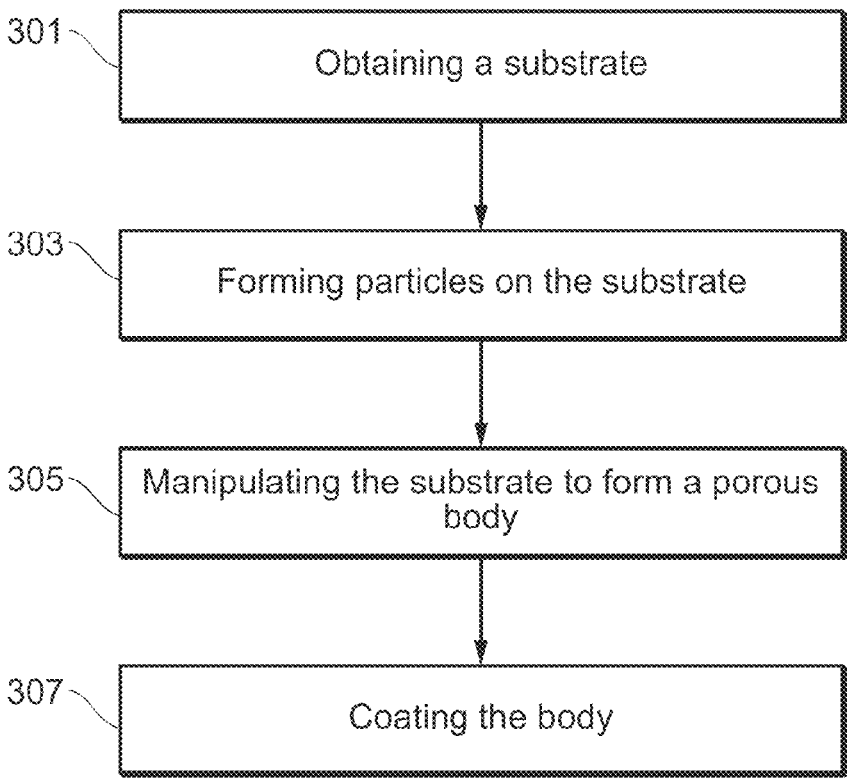
FIG. 3 includes a flow chart for forming a porous body according to an embodiment.
Figure 4A:
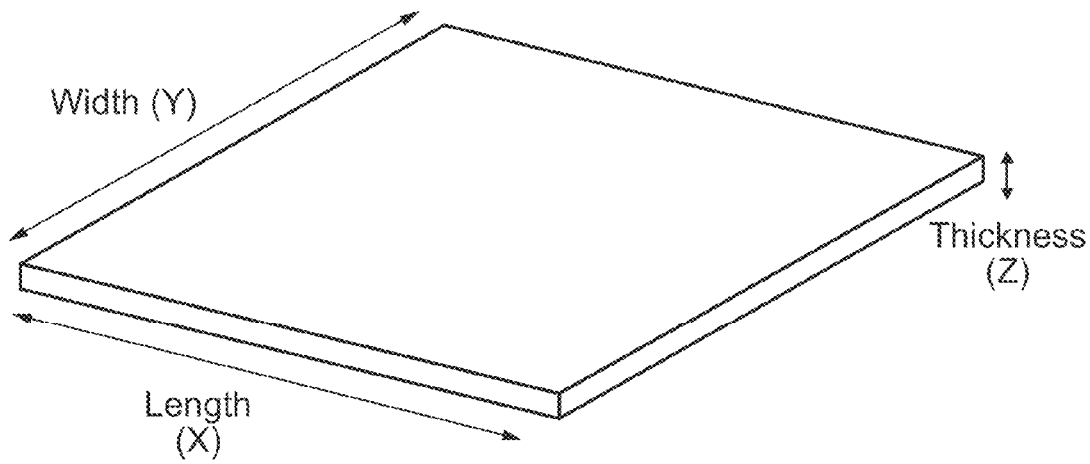
FIGS. 4a and 4b include perspective view illustrations of substrates according to an embodiment.
Figure 4B:
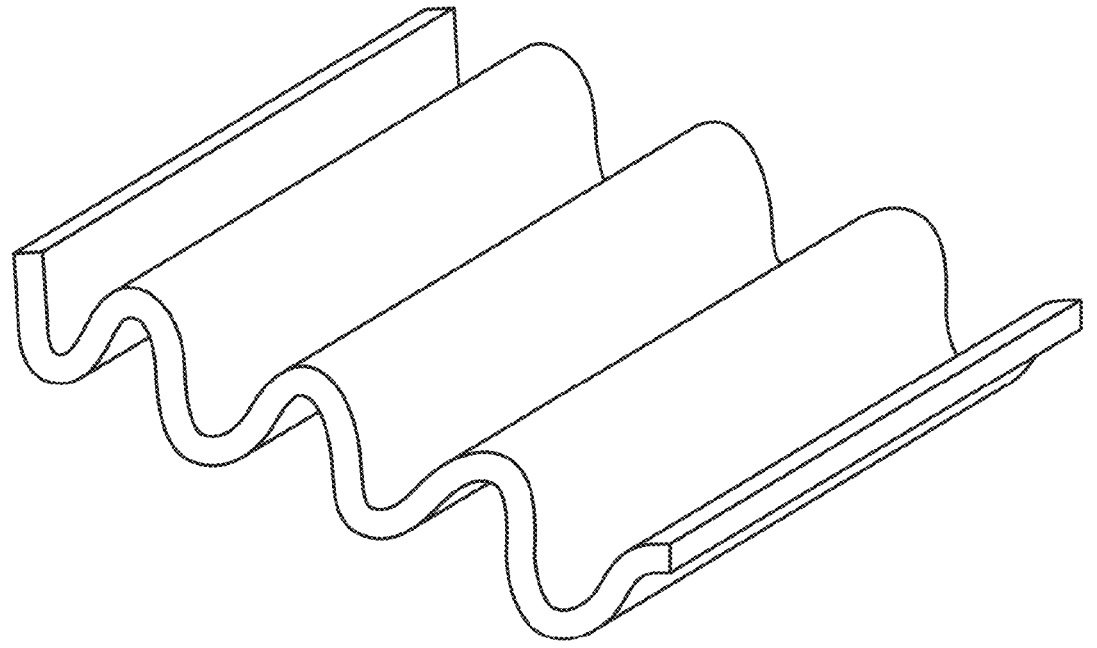

In an embodiment, a that may facilitate improved manufacturing and/or performance of the porous body having any one or more of the features described herein may be formed according to the process outlined in FIG. 3. The process for forming the porous body may begin at step 301, which includes obtaining a suitable substrate. A substrate may be one or more substantially sheet-like materials. FIGS. 4*a* and 4*b* provide perspective view illustrations of suitable shapes for the substrate. Generally, the substrate has a sheet-like structure wherein the dimensions of the length and width are substantially greater than the thickness, such that the length is greater than or equal to the width and the width and length are greater than the thickness. In at least one embodiment, the body of the substrate has a length that is at least 10 times or at least 100 times or even at least 1000 times greater than the thickness of the body of the substrate. In another embodiment, the width of the body of the substrate can be at least 10 times or at least 100 times or at least 1000 times greater than the thickness of the body.

According to one non-limiting embodiment, it may be desirable that the average thickness of the body of the substrate be relatively thin to reduce the wall thickness of the porous body, which may facilitate improved operation of the porous body, including but not limited to a particular suitable pressure drop of the porous body. In one embodiment, the average thickness of the body may not greater than 100 mm such as not greater than 90 mm or not greater than 80 mm or not greater than 70 mm or not greater than 60 mm or not greater than 50 mm or not greater than 40 mm or not greater than 30 mm or not greater than 20 mm or not greater than 10 mm or not greater than 5 mm or not greater than 1 mm. In still other embodiments, the average thickness of the body may be at least 0.05 mm or at least 0.1 mm or at least 0.2 mm or at least 0.3 mm or at least 0.4 mm or at least 0.5 mm or at least 0.6 mm or at least 0.7 mm or at least 0.8 mm. The average thickness of the body may be a value between any of the minimum and maximum values noted above, including for example, but not limited to, within a range of at least 0.05 mm and not greater than 100 mm, or at least 0.1 mm and not greater than 10 mm or at least 0.5 mm and not greater than 5 mm.

According to one aspect, the material of the substrate may include any suitable material that may facilitate improved manufacturing and/or performance of the porous body. In an embodiment, the substrate may include a metal, metal alloy, ceramic, polymer, or any combination thereof. In one embodiment, the substrate may be a monolithic and non-porous body, such as a sheet of metal. In still, other embodiments, the substrate may be a fibrous body, including for example, but not limited to, a woven structure, a non-woven structure, or the like. According to another embodiment, the substrate may include one or more materials including a polycrystalline phase, an amorphous material, a single-crystalline phase, or any combination thereof. The substrate may consist essentially of any one or more of the features described herein.

According to one embodiment, the substrate may include a fabric or mesh. In another non-limiting embodiment, the substrate may define a continuous structure that can be used to transport heat either into, or out of, the system to better control the temperature, temperature response and temperature uniformity in the system. To facilitate the heat transfer it is preferred the substrate be comprised of thermally conductive materials such as metals, steel, aluminum, alumina, or the like. There may be other occasions where thermal insulation is required in which case polymers, silica, quartz, fiberglass and like may be used as part or all of the substrate. In other situations, a combination of thermally conductive and insulating materials may be utilized. The specific design criteria may be adapted depending on the application and the nature of the endothermic and/or exothermic processes.

According to one embodiment, the porous body may include an active material that may facilitate improved manufacturing and/or performance of the porous body. In an embodiment, at least a portion of the porous body may include an active material. In an embodiment, the active material may be a coating covering at least a portion of the porous body. In an embodiment, the substrate may include an active material. An active material is a material that is configured to interact (e.g., chemically react, adsorb) with a material flowing through the porous body. In an embodiment, the active material may be a discrete phase or structure that is part of a composite substrate structure, such as a substrate having a core and a coating, wherein the coating may include the active material. Alternatively, in another non-limiting embodiment, the substrate may consist essentially of the active material. In one non-limiting embodiment, the active material may include a ceramic, a glass, a fibrous material, a natural material, oxides, carbides, nitrides, halides, hydroxides, clay, polymers, metal, metal alloys or any combination thereof. Some suitable, non-limiting examples of an active material can include activated carbon, metal organic frameworks, zeolites, boron nitride, titanium dioxide, silicon dioxide, zirconium dioxide, vanadium pentoxide, cerium oxide, lanthanum oxide, and alumina doped with platinum, palladium, rhodium, gold, silver, and other precious metals, layered double hydroxides, cordierite, lithium bayerite, ion exchange resins including but not limited to lithium titanium oxide, lithium manganese oxide, lithium iron phosphate, graphene, carbon nanotubes, manganese dioxide, manganese oxide, lanthanum strontium manganite, antimicrobial materials (e.g., anti-bacterial material, anti-fungal material, anti-viral material, or any combination thereof), polymers, metals, metal alloys, ceramics, glass, or any combination thereof.

According to one non-limiting embodiment, it may be desirable that the substrate be relatively flexible. In at least one non-limiting instance, the flexibility of the substrate may be balanced with the average thickness of the substrate to ensure suitable manufacturability and performance of the porous body. In one instance, the flexibility of the substrate may be similar to that of paper or similar to that of sheet metal or similar to woven or non-woven fabrics of various weights.

After obtaining a suitable substrate at step 301, the process may continue at step 303 by disposing discrete spacer particles on the substrate. The discrete spacer particles may be affixed to the substrate using any suitable means, including for example, but not limited to, mechanical attachment, chemical bonding, an adhesive or other intermediate attachment material (e.g., braze), or any combination thereof. The discrete spacer particles may be disposed on the substrate to assist with defining the channels of the porous body. The discrete spacer particles may assist with controlling the spacing between layers of the substrate if or when it is manipulated into another shape (e.g., rolled), and can direct fluid flow around and through the pores of the discrete spacer particles. See, for example, FIGS. 6a and 6b.

According to one embodiment, certain aspects of the discrete spacer particles may be adapted to obtain a desired performance of the porous body. For example, the shape of the discrete spacer particles (blocky, platelet, acicular, rod-like, cone-like, spherical, etc.), the particle size distribution (e.g., D50, D10, D90, D10-D90, etc.) of the discrete spacer particles, the length, the height, the width, the composition of the discrete spacer particles, the porosity, the helix angle, the morphology of the discrete spacer particles (e.g., porous agglomerates or unagglomerated), the porosity of the discrete spacer particles may be controlled to obtain a desired performance of the porous body. It will be appreciated that a combination of any of the aspects of the discrete spacer particles may be combined to facilitate improved manufacturing and/or performance of the porous body.

Figure 7A:
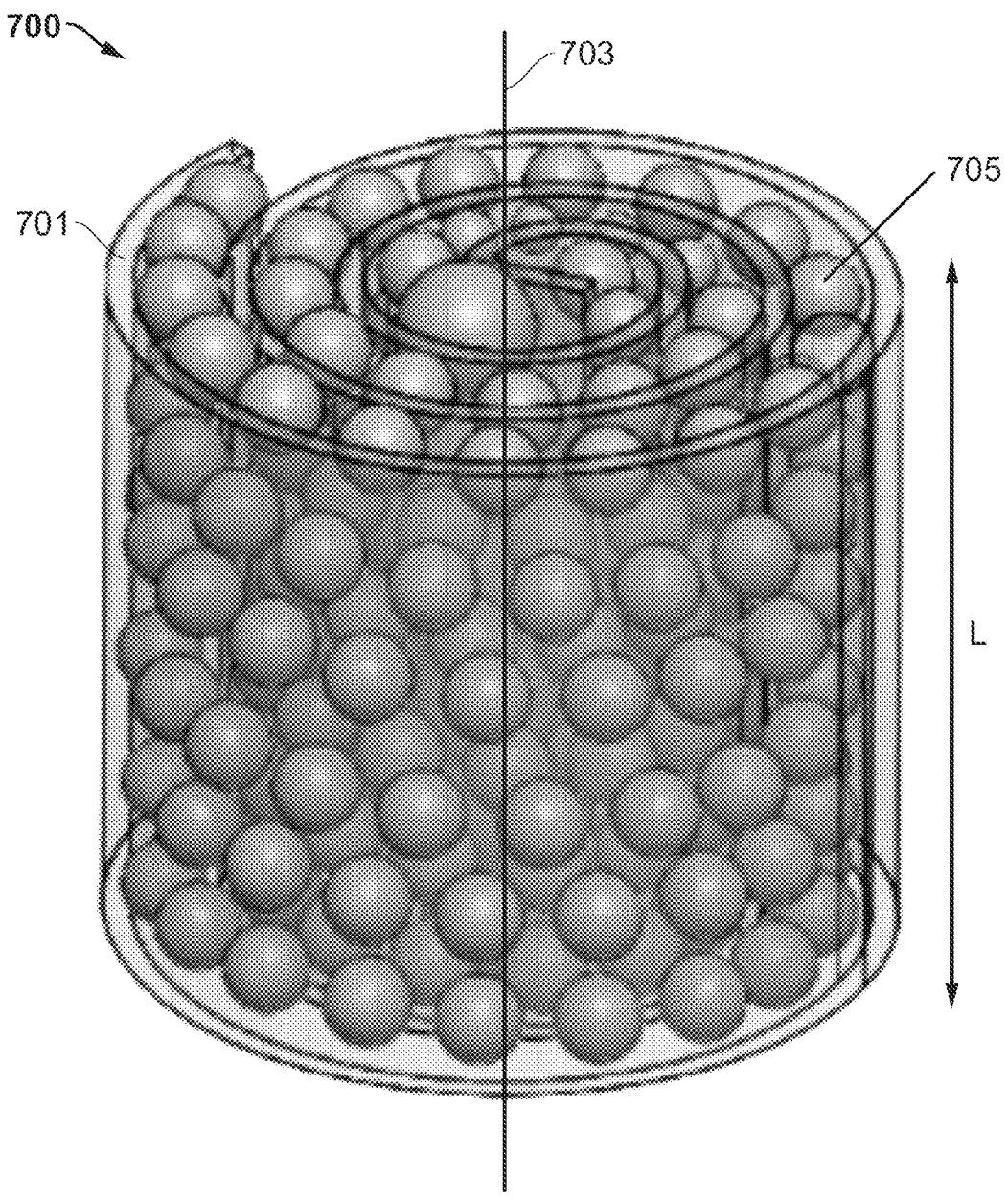
FIG. 7a includes a perspective view illustration of a porous body formed according to an embodiment.
Figure 7B:
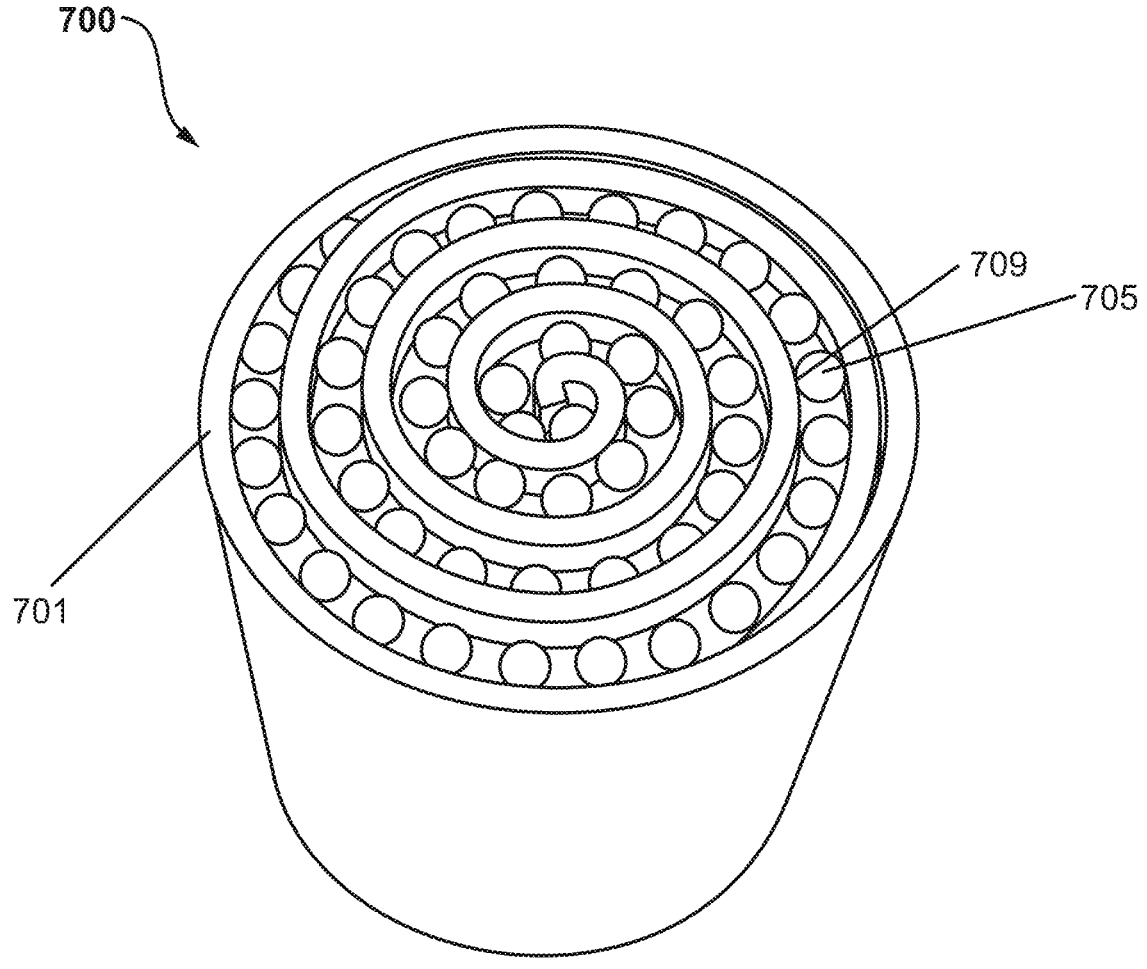
FIG. 7b includes a perspective view illustration of a porous body formed according to an embodiment.

FIG. 7 includes an example of a porous body 700 according to an embodiment. In an embodiment, the porous body 700 may include a substrate 701 and the substrate 701 may include a longitudinal axis 703 along a length L of the substrate 701. FIG. 7b includes a perspective view of the porous body 700. In an embodiment, the substrate 701 of the porous body 700 may define a spiral shape when viewed in a plane perpendicular to the longitudinal axis 703. In still another embodiment, the porous body 700 may include a plurality of discrete spacer particles 705 attached to the substrate 701.

Figure 8A:
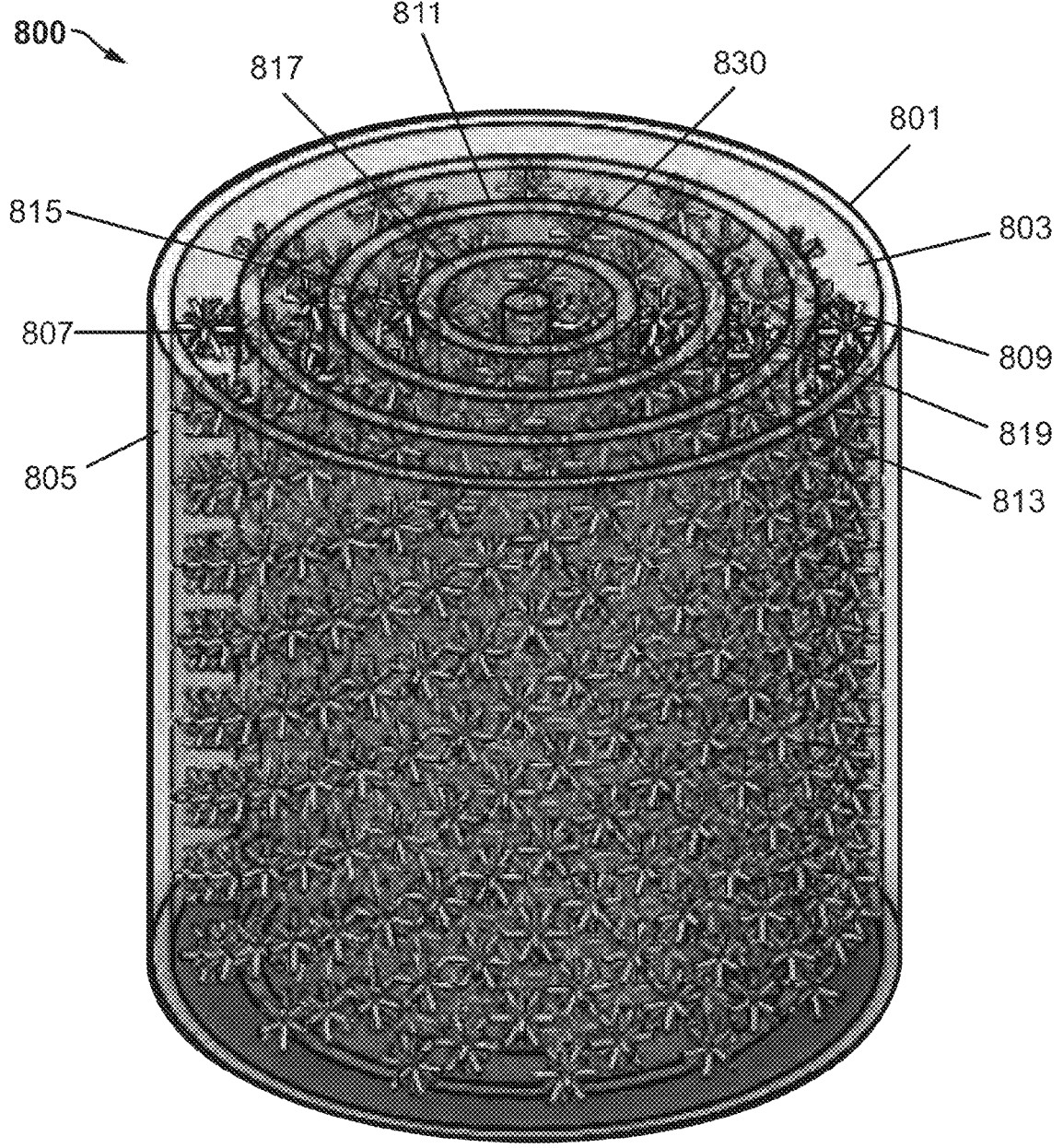
FIG. 8a includes a perspective view illustration of a porous body formed according to an embodiment.

In an embodiment, the porous body may be formed through any suitable manufacturing methods to form a continuous, monolithic body as described herein. FIG. 8a includes an example of a porous body according to an embodiment. The porous body 800 may include an outer tubular structure 801 having an inner surface 803 and an outer surface 805 and a first plurality of discrete spacer particles 807 attached to the inner surface 803 of the outer tubular structure 801. The porous body 800 may include a first inner tubular structure 809 having an inner surface closest to a central structure 830 and an outer surface closest to the outer tubular structure 801 wherein the outer surface of the first inner tubular structure 809 abuts the first plurality of discrete spacer particles 807. In a particular embodiment, the porous body may further include a second plurality of discrete spacer particles 813 attached to an inner surface of the first inner tubular structure 809. The porous body 800 may include a second inner tubular structure 811 having an inner surface closest to a central structure 830 and outer surface closest to the outer tubular structure 801 wherein the outer surface of the second inner tubular structure 811 abuts the second plurality of discrete spacer particles 813 The porous body 800 may include a third plurality of discrete spacer particles 815 attached to the inner surface of the second inner tubular structure 811. The porous body 800 may include a third inner tubular structure 817 an inner surface closest to a central structure 830 and outer surface closest to the outer tubular structure 801 wherein the outer surface of the third inner tubular structure 817 abuts the third plurality of discrete spacer particles 815. The porous body 800 may include a fourth plurality of discrete spacer particles 819 attached to the inner surface of the third inner tubular structure 817. The fourth plurality of discrete spacer particles 819 may abut a central structure 830 defining a central portion of the porous body 800. As used herein, the first inner tubular structure, the second inner tubular structure, the third inner tubular structure and the central structure may include any of the characteristics of the plurality of inner tubular structures described herein.

In still another embodiment, the porous body may include a plurality of inner tubular structures that may facilitate improved manufacturing and/or performance of the porous body. In a particular embodiment, the porous body may include at least one inner tubular structure, such as at least two inner tubular structures, or at least 3 inner tubular structures, or at least 4 inner tubular structures, or at least 5 inner tubular structures, or at least 6 inner tubular structures, or at least 7 inner tubular structures, or at least 8 inner tubular structures. In a particular embodiment, the porous body may include not greater than 20 inner tubular structures, such as not greater than 18 inner tubular structures, or not greater than 15 inner tubular structures, or not greater than 12 inner tubular structures, or not greater than 10 inner tubular structures. The porous body may include any number of inner tubular structures between any of the minimum and maximum values noted above, including for example, but not limited to within a range of at least one and not greater than 20 inner tubular structures, or at least two and not greater than 10 inner tubular structures.

Figure 8B:
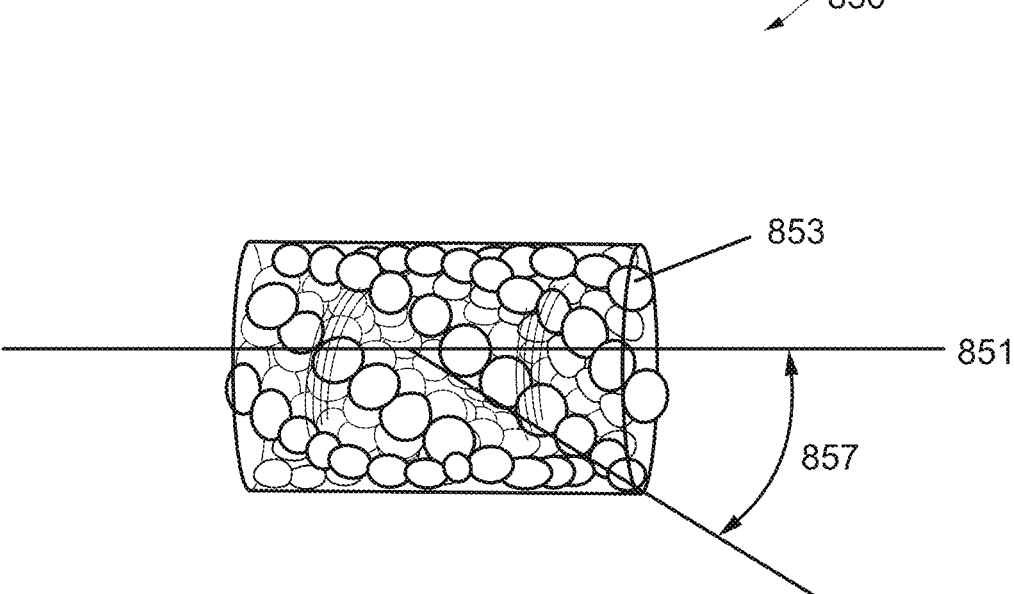
FIG. 8b includes a perspective view illustration of a porous body formed according to an embodiment.

Referring again to FIG. 8a, the discrete spacer particles may extend in a non-linear path along the circumferential surface of the inner tubular structures. In an embodiment, the discrete spacer particles may extend in a helical path along the circumferential surface of the inner tubular structures defining a helix angle that may facilitate improved performance of the porous body 800. In an embodiment, the discrete spacer particles may extend in a helical path along the circumferential surface of the substrate of the porous body 850. The helix angle of the discrete spacer particles distributed within the porous body may be calculated by measuring the angle between the helical path defined by the discrete spacer particles and a central axis of the porous body when viewed from the side. For example, as shown in FIG. 8b illustrating a perspective view of a porous body 850, the porous body 850 includes a central axis 851 and discrete spacer particles 853 defining a helical path 855 along the circumferential surface of the substrate. The helical path 855 and the central axis 851 define a helix angle 857. In an embodiment, the discrete spacer particles may define a helix angle of at least 30 degrees, such as at least 31 degrees, at least 32 degrees, at least 33 degrees, at least 34 degrees, at least 35 degrees, at least 36 degrees, at least 37 degrees, at least 38 degrees, at least 39 degrees, at least 40 degrees, at least 41 degrees, at least 42 degrees, at least 43 degrees, at least 44 degrees, at least 45 degrees, at least 46 degrees, at least 47 degrees, at least 48 degrees, at least 49 degrees, at least 50 degrees, at least 51 degrees, at least 52 degrees, at least 53 degrees, at least 54 degrees, at least 55 degrees, at least 56 degrees, at least 57 degrees, at least 58 degrees, at least 59 degrees or at least 60 degrees. In still another embodiment, the discrete spacer particles may have a helix angle of not greater than 89 degrees, such as not greater than 88 degrees, or not greater than 87 degrees, or not greater than 86 degrees, or not greater than 85 degrees, or not greater than 84 degrees, or not greater than 83 degrees, or not greater than 82 degrees, or not greater than 81 degrees, or not greater than 80 degrees, or not greater than 79 degrees, or not greater than 78 degrees, or not greater than 77 degrees, or not greater than 76 degrees, or not greater than 75 degrees, or not greater than 74 degrees, or not greater than 73 degrees, or not greater than 72 degrees, or not greater than 71 degrees, or not greater than 70 degrees, or not greater than 69 degrees, or not greater than 68 degrees, or not greater than 67 degrees, or not greater than 66 degrees, or not greater than 65 degrees, or not greater than 64 degrees, or not greater than 63 degrees, or not greater than 62 degrees, or not greater than 61 degrees. The discrete spacer particles may have a helix angle between any of the minimum and maximum values noted above, including for example, but not limited to within a range of at least 30 degrees and not greater than 89 degrees, or at least 40 degrees and not greater than 80 degrees, or at least 50 degrees and not greater than degrees.

According to one aspect, the material of the outer tubular structure 801 and the plurality of inner tubular structures 809, 811, 817 may include any suitable material that may facilitate improved manufacturing and/or performance of the porous body. In an embodiment, the material may include a metal, metal alloy, ceramic, polymer, or any combination thereof. In still, other embodiments, the outer tubular structure 801 and the plurality of inner tubular structures 809, 811, 817 may be a fibrous body, including for example, but not limited to, a woven structure, a non-woven structure, or the like. According to another embodiment, the outer tubular structure 801 and the plurality of inner tubular structures 809, 811, 817 may include one or more materials including a polycrystalline phase, an amorphous material, a single-crystalline phase, or any combination thereof. The outer tubular structure 801 and the plurality of inner tubular structures 809, 811, 817 may consist essentially of any one or more of the features described herein.

According to one embodiment, the outer tubular structure 801 and the plurality of inner tubular structures 809, 811, 817 may include a fabric or mesh. In another non-limiting embodiment, the outer tubular structure 801 and the plurality of inner tubular structures 809, 811, 817 may define a continuous structure that can be used to transport heat either into, or out of, the system to better control the temperature, temperature response and temperature uniformity in the system. To facilitate the heat transfer it is preferred the outer tubular structure 801 and the plurality of inner tubular structures 809, 811, 817 be comprised of thermally conductive materials such as metals, steel, aluminum, alumina, or the like. There may be other occasions where thermal insulation is required in which case polymers, silica, quartz, fiberglass and like may be used as part or all of the outer tubular structure 801 and the plurality of inner tubular structures 809, 811, 817. In other situations, a combination of thermally conductive and insulating materials may be utilized. The specific design criteria may be adapted depending on the application and the nature of the endothermic and/or exothermic processes.

According to one embodiment, the outer tubular structure 801 and the plurality of inner tubular structures 809, 811, 817 may include an active material that may facilitate improved manufacturing and/or performance of the porous body. In an embodiment, the active material may be a coating covering at least a portion of, the outer tubular structure 801 and the plurality of inner tubular structures 809, 811, 817. An active material is a material that is configured to interact (e.g., chemically react, adsorb) with a material flowing through the porous body. The active material may be a discrete phase or structure that is part of a composite substrate structure, such as an outer tubular structure 801 and the plurality of inner tubular structures 809, 811, 817 having a core and a coating, wherein the coating may include the active material. Alternatively, in another non-limiting embodiment, the outer tubular structure 801 and the plurality of inner tubular structures 809, 811, 817 may consist essentially of the active material. In one non-limiting embodiment, the active material may include a ceramic, a glass, a fibrous material, a natural material, oxides, carbides, nitrides, halides, hydroxides, clay, polymers, metal, metal alloys, or any combination thereof. Some suitable, non-limiting examples of an active material can include activated carbon, metal organic frameworks, zeolites, boron nitride, titanium dioxide, silicon dioxide, zirconium dioxide, vanadium pentoxide, cerium oxide, lanthanum oxide, and alumina doped with platinum, palladium, rhodium, gold, silver, and other precious metals, layered double hydroxides, cordierite, lithium bayerite, ion exchange resins including but not limited to lithium titanium oxide, lithium manganese oxide, lithium iron phosphate, graphene, carbon nanotubes, manganese dioxide, manganese oxide, lanthanum strontium manganite, antimicrobial materials (e.g., anti-bacterial material, anti-fungal material, anti-viral material, or any combination thereof), polymers, metals, metal alloys, ceramics, glass, or any combination thereof.

FIGS. 9a-9h include various two-dimensional illustrations of the shape of the discrete spacer particles. The embodiments herein are not strictly limited to the shapes illustrated in FIGS. 9a-9h. The shape of the discrete spacer particles may be modified to improve manufacturing and/or improve the operation of the porous product. According to one non-limiting embodiment, the discrete spacer particles may have any regular or irregular shape, such as a regular or irregular polygonal shape, complex shapes with arcuate portions including for example, but not limited to concave or convex portions, and the like. In one embodiment, the spacing particle may include shapes such as trilobes, rings, discs, particles with regular or irregular roughened surfaces (e.g., grooves, dimples, protrusions, and the like. The discrete spacer particles may have a controlled porosity and/or permeability creating smaller flow channels through the volume of the discrete spacer particles.

Figure 9A:
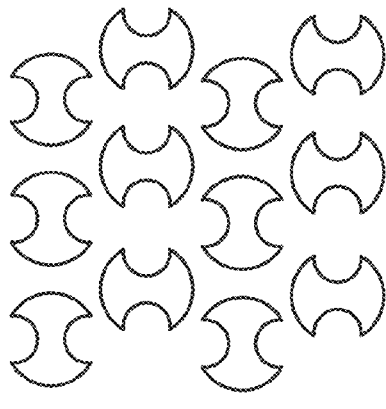
FIGS. 9a-9h include various two-dimensional illustrations of the shape of the discrete spacer particles according to an embodiment.
Figure 9B:
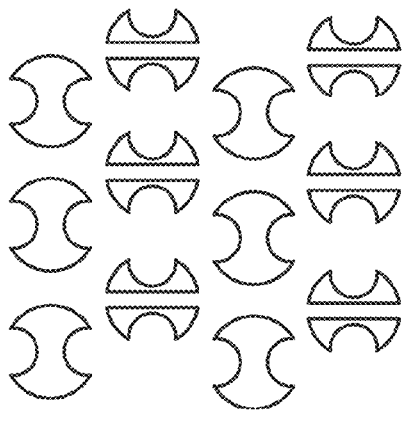
Figure 9C:
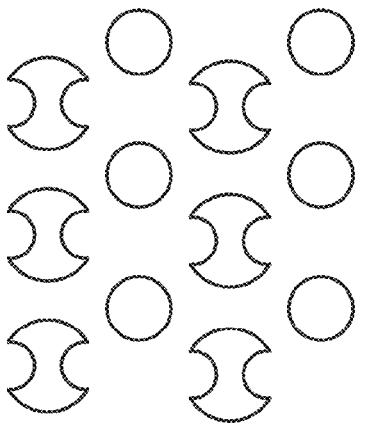
Figure 9D:
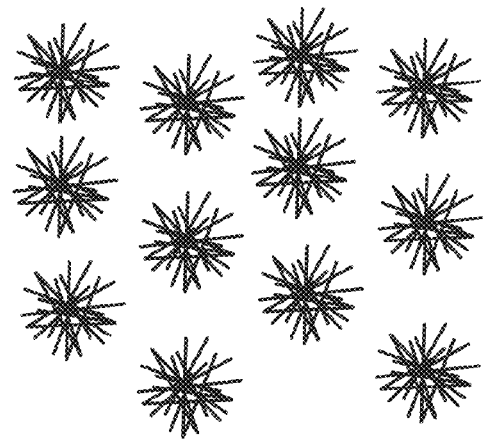
Figure 9E:
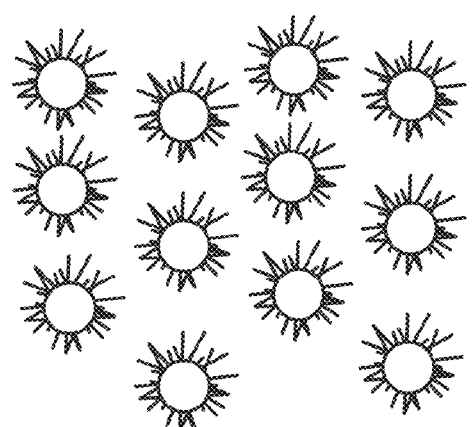
Figure 9F:
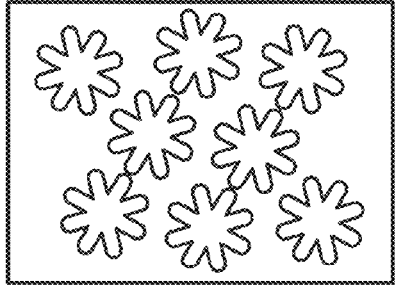
Figure 9G:
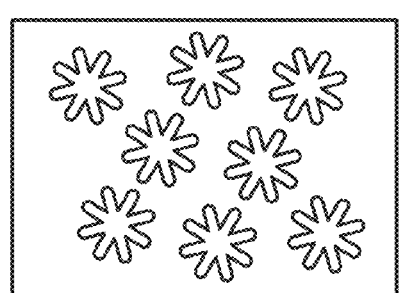
Figure 9H:
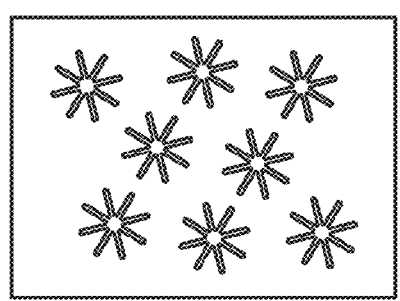
Figure 10A:
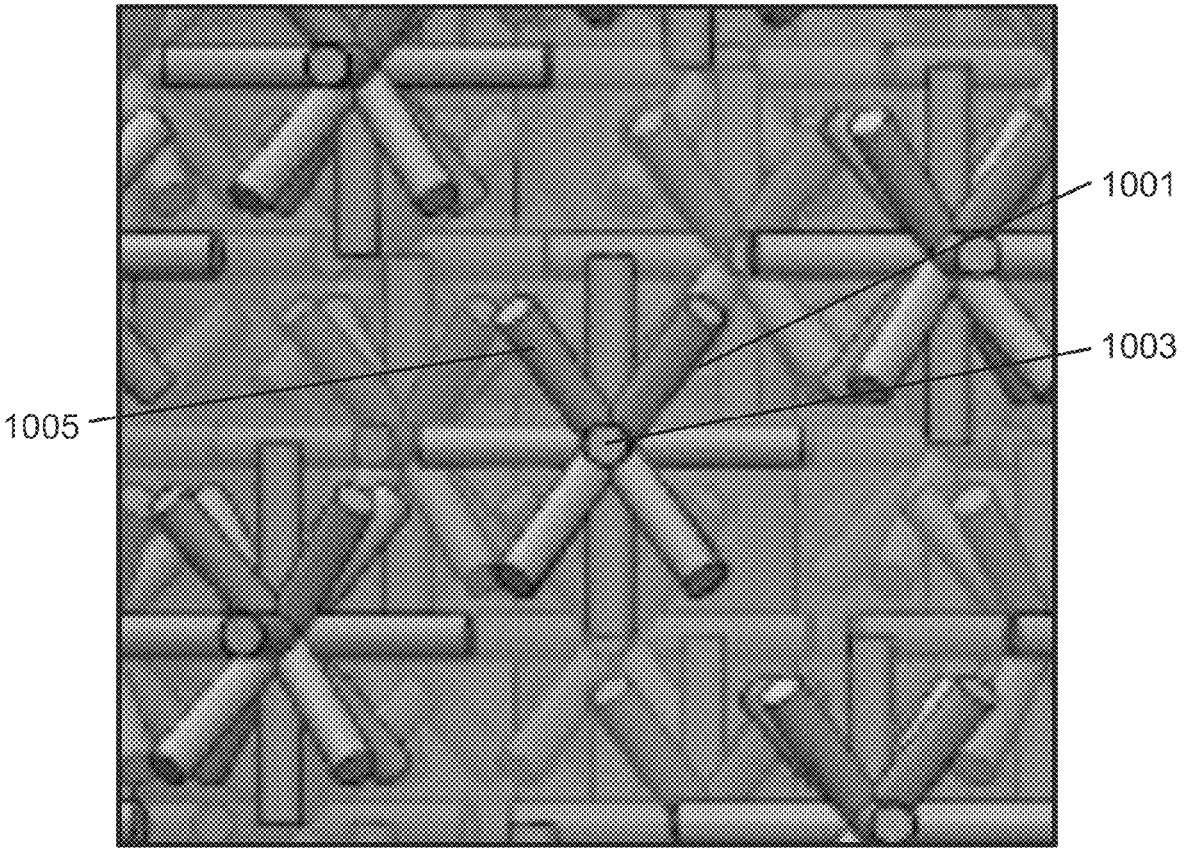
FIG. 10a-10b include perspective view illustrations of a multi-armed discrete spacer particle according to an embodiment.
Figure 10B:

FIG. 9f-9h include various two-dimensional illustrations of discrete spacer particles having a multi-armed shape. FIG. 10a includes a three-dimensional illustration of a discrete spacer particle having a multi-armed shape. In an embodiment, the spacer particle 1001 may include a plurality of arms 1005 extending from a central portion 1003. FIG. 10b includes an illustration of a multi-armed shaped discrete spacer particle 1001 in a porous body according to an embodiment herein. In a particular embodiment, the discrete spacer particle 1001 may form a contact point 1007 with the outer tubular structure 1009, the plurality of inner tubular structures 1011, or a combination thereof. As used herein, the contact point is used to describe the portion of the porous body where a portion of a discrete spacer particle contacts a portion of the outer tubular structure, the substrate, one or more of the plurality of inner tubular structures, or a combination thereof. In an embodiment, the contact point forms a continuous connection between the discrete spacer particle 1001 and the outer tubular structure, the plurality of inner tubular structures, the substrate, or a combination thereof. In the example illustrated in FIG. 10b, the multi-armed shaped discrete spacer particle 1001 forms a contact point 1007 with the inner tubular structure 1011 and a contact point with the outer tubular structure 1009 (not shown). In the example illustrated in FIG. 7b, the discrete spacer particle 705 forms a contact point 709 with the substrate 701.

In a particular embodiment, the discrete spacer particle having a multi-armed shape may include at least one arm, such as at least two arms, or at least three arms, or at least four arms, or at least five arms, or at least six arms, or at least seven arms, or at least eight arms, or at least nine arms, or at least ten arms, or at least eleven arms, or at least twelve arms. In still another embodiment, the discrete spacer particle may include not greater than 50 arms, such as not greater than 40 arms, or not greater than 30 arms, or not greater than 20 arms. The discrete spacer particle may include any number of arms between any of the minimum and maximum values noted above, including for example, but not limited to, within a range of at least one and not greater than 50 arms, or at least 6 arms and not greater than 20 arms.

According to one embodiment, the discrete spacer particles may include a material that may facilitate improved manufacturing and/or performance of the porous body. In an embodiment, the discrete spacer particles may include a ceramic, a glass, a metal, a metal alloy, a polymer, a natural material, a synthetic material, a fibrous material (e.g., fiberglass or natural fiber such as cotton), a porous material (e.g., foam), or any combination thereof. The discrete spacer particles may include an amorphous phase, a polycrystalline phase, a monocrystalline phase, or any combination thereof. In one particular embodiment, the discrete spacer particles may include an active material as provided in the embodiments herein. In one particular embodiment, the discrete spacer particles may consist essentially of one or more active materials as described in embodiments herein.

For at least one non-limiting embodiment the discrete spacer particles may include an active material. In an embodiment, the discrete spacer particles may consist essentially of an active material. In still another embodiment, the active material may be incorporated into the discrete spacer particles as a discrete phase. In an embodiment, the active material may be a coating on at least a portion of the discrete spacer particles. An active material or active particle may include a material that is configured to interact (e.g., have a chemical reaction with or adsorb) with a fluid flowing through the porous body and coming into contact with the discrete spacer particles. In one non-limiting embodiment, the discrete spacing particle may include a ceramic, a glass, a fibrous material, a natural material, oxides, carbides, nitrides, halides, hydroxides, clay, polymers, metal, metal alloys, or any combination thereof. Some suitable, non-limiting examples of materials for use in the discrete spacer particles may include activated carbon, metal organic frameworks, zeolites, boron nitride, titanium dioxide, silicon dioxide, zirconium dioxide, vanadium pentoxide, cerium oxide, lanthanum oxide, and alumina doped with platinum, palladium, rhodium, gold, silver, and other precious metals, layered double hydroxides, cordierite, lithium bayerite, ion exchange resins including but not limited to lithium titanium oxide, lithium manganese oxide, lithium iron phosphate, graphene, carbon nanotubes, manganese dioxide, manganese oxide, lanthanum strontium manganite, antimicrobial materials (e.g., anti-bacterial material, anti-fungal material, anti-viral material, or any combination thereof), or any combination thereof.

Figure 11:
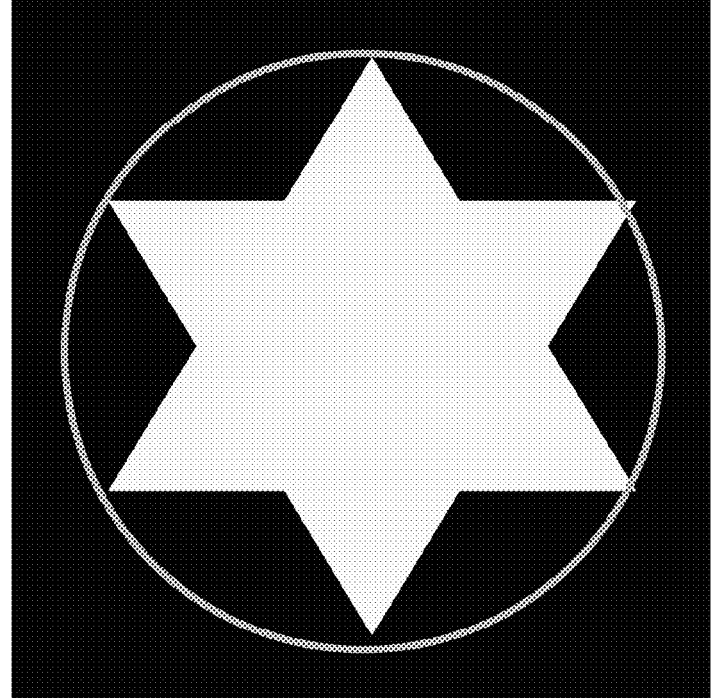
FIG. 11 includes a black and white image of an outline of a discrete spacer particle according to an embodiment for calculation of solidity.

For at least one non-limiting embodiment, the discrete spacer particles may have a particular shape as defined by solidity that may facilitate improved manufacturing and/or performance of the porous body. The solidity of the discrete spacer particle is measured by dividing the actual area of the body of a discrete spacer particle as viewed in two dimensions by a convex hull area of the body of the discrete spacer particle as viewed in two dimensions. Measurement of the actual area and convex hull area of the discrete spacer particles can be conducted by taking images of a statistically relevant sample size of discrete spacer particles from a batch. The images can be taken by a suitable optical imaging device (e.g., Olympus DSX) at a suitable magnification (e.g., 10-20×). The images are then saved and analyzed using image processing software, such as ImageJ. A separate image is created for each spacer particle. Each of the images of the discrete spacer particles is turned into a black and white only image. FIG. 11 includes a two-dimensional black and white image of a discrete spacer particle according to an embodiment. Using an image like the image of FIG. 11, the image processing software calculates the area in white as the actual area of the body of the discrete spacer particle as viewed in two dimensions of the length and width or length and thickness. Using the image processing software, a convex hull is drawn around the perimeter of the discrete spacer particle using the shape filter plugin in ImageJ. The imaging processing software then calculates the area inside the convex hull. The solidity is calculated for each particle based on the actual area of each discrete spacer particle divided by the convex hull area. The average solidity is the average of the solidity values for all of the measured discrete spacer particles. The solidity standard deviation is also calculated from all of the solidity values measured from the discrete spacer particles in the sample.

In an embodiment, the discrete spacer particles can have a particular solidity that may facilitate improved manufacturing and/or performance of the porous body. For example, the discrete spacer particles can have an average solidity of at least 0.5 or at least 0.55 or at least 0.6 or at least 0.65 or at least 0.70 or at least 0.75 or at least 0.80 or at least 0.85. In another non-limiting embodiment, the discrete spacer particles may have an average solidity of not greater than 1.0 or not greater than 0.9999 or not greater than 0.95 or not greater than 0.90 or not greater than 0.85. It will be appreciated that the average solidity of the discrete spacer particles may be within a range including any of the minimum and maximum values noted above, for example, but not limited to a range of at least 0.5 to not greater than 0.9999, or at least 0.55 to not greater than 0.95.

In an embodiment, the porous body can have a particular porosity that may facilitate improved manufacturing and/or performance. For at least one non-limiting embodiment, the porous body may have a particular porosity as defined herein. The porosity of the porous body is measured by dividing the solid volume of the porous body by the cylinder volume of the porous body and subtracting from 1. See the equation below:

$$\text{Porosity} = \left(1 - \frac{\text{solid volume}}{\text{cylinder volume}}\right).$$

The solid volume is defined as the true volume of the porous body being measured. The cylinder volume is the solid volume of the porous body calculated using the outer cylinder, i.e., the outer tubular structure as used herein. To calculate the solid volume, a 3-D model of porous body is developed using a CAD software such as Solid Works or OnShape, and a solid volume is given. The cylinder volume can be calculated using the geometric formula $V = \pi r^2 h$, where r is the radius of the porous body and h is the height of the porous body as defined by the central axis 851.

According to one embodiment, the porous body can have a particular porosity that may facilitate improved manufacturing and/or performance of the porous body. For example, the porous body may have a porosity of at least 0.5 or at least 0.55 or at least 0.6 or at least 0.65 or at least 0.70. In another non-limiting embodiment, the porous body may have a porosity of not greater than 0.9999 or not greater than 0.95 or not greater than 0.90 or not greater than 0.85 or not greater than 0.8 or not greater than 0.75. It will be appreciated that the porosity of the porous body may be within a range including any of the minimum and maximum values noted above, for example, but not limited to a range of at least 0.5 to not greater than 0.9999, or at least 0.60 to not greater than 0.8.

In an embodiment, the porous body may have a crush strength that may facilitate improved manufacturing and/or performance of the porous body. In an embodiment, the porous body may have a crush strength of at least at least 1 N, such as at least 2 N, or at least 3 N, or at least 4 N, or at least 5 N, or at least 6 N, or at least 7 N, or at least 8 N, or at least 9 N or at least 10 N, or at least 15 N, or at least 20 N, or at least 25 N, or at least 30 N, or at least 35 N or at least 40 N, or at least 45 N, or at least 50 N. In still another embodiment, the porous body may have a crush strength of not greater than 200 N, such as not greater than 180 N, or not greater than 160 N, or not greater than 140 N, or not greater than 120 N, or not greater than 100 N, or not greater than 80 N, or not greater than 60 N. The crush strength of the porous body may be a value between any of the minimum and maximum values noted above, including for example, but not limited to, within a range of at least 10N to not greater than 200 N, or at least 20 N and not greater than 160 N. The crush strength of the porous bodies can be measured using a standard test method for single pellet crush strength of formed catalysts and catalyst carriers, ASTM Standard ASTM D4179.

As noted herein, in addition to the aspects of the distribution of the discrete spacer particles on one or more major surfaces of the substrate may be controlled and adapted to facilitate desired manufacturing and/or performance of the porous body. The distribution of the discrete spacer particles may include the spacing distance between adjacent (e.g., nearest) discrete spacer particles, the position of the discrete spacer particles on the planar surface, the orientation of one or more dimensions of the discrete spacer particles relative to an X or Y direction of the substrate, the areal density or coverage of the discrete spacer particles on the one or more major surfaces of the substrate or any combination thereof. In one embodiment, the position of at least a portion of the discrete spacer particles (e.g., at least 25% of all discrete spacer particles or at least 50% of all discrete spacer particles or at least 75% of all discrete spacer particles or at least 90% of all discrete spacer particles or even essentially all of the discrete spacer particles) may define a controlled distribution that may have short-range order and/or long-range order. For example, the position of at least a portion of the discrete spacer particles may define a pattern, wherein the pattern may include a smallest unit that is repeated over at least a portion of the surface area of at least one of the major surfaces of the substrate. Patterns may include but are not limited to those that create structures for axial pathways, sinuous pathways, anisotropic structures, and pathways with baffles.

In at least one embodiment, it may be desirable that the position of the discrete spacer particles be staggered relative to each other in at least one of the X or Y directions, such that when the porous structure is created, a channel extending through the body is non-linear or even tortuous as the discrete spacer particles in the staggered configuration define a tortuous pathway. FIGS. 12*a*-12*d* include images of sample porous bodies made by attaching discrete spacer particles to a substrate to demonstrate a distribution of discrete spacer particles and a manipulation of the substrate (e.g., rolling) to create a porous body that has substantially linear flow paths extending through the porous body. In FIG. 12*a* the discrete spacer particles are aligned in one direction (e.g., Y direction) and may create a linear pathway in the Y direction in the porous body. FIGS. 13*a*-13*c* include images of sample porous bodies made by attaching discrete spacer particles to a substrate to demonstrate a distribution of discrete spacer particles and a manipulation of the substrate (e.g., rolling) to create a porous body that has substantially non-linear flow paths extending through the porous body. The distribution of the discrete spacer particles in FIGS. 13*a*-13*c* is different, such that they are staggered and define a non-linear pathway in at least one direction (e.g., Y-direction) if not both directions (i.e., X and Y).

It will be appreciated that the combination of the distribution of the discrete spacer particles and the aspects of the discrete spacer particles as noted above may be adapted.

In one aspect, the process for disposing the discrete spacer particles on the substrate may include disposing the discrete spacer particles on at least one major surface of the substrate. In another embodiment, the process for disposing the discrete spacer particles on the substrate may include disposing the discrete spacer particles on the first and second major surfaces of the substrate, wherein the substrate has a substantially sheet-like body having first and second major surfaces defining the length and width of the body and a thickness extending in a direction perpendicular to the plane defined by the length and width, and wherein the thickness defines a dimension separating the first and second major surfaces. Suitable processes for disposing of the discrete spacer particles may include, but are not limited to, deposition, drip casting, spray deposition, lithographic methods, screen printing, extrusion, pressing, ink printing, pick and place operations (e.g., automated pick and place devices), templating, gravity assisted deposition, electrostatic-assisted deposition, vibratory-assisted deposition, or any combination thereof.

The process may continue at step 305 by manipulating the substrate to form a porous body. Manipulating the body may include altering the body to change the shape of the substrate. For example, in one instance, the substrate and discrete spacer particles may be rolled into a cylindrical body generally having a circumference and length. In such instances, the body may have a spiral configuration as viewed in cross-section wherein the distance between adjacent layers in the spiral is controlled by one or more aspects of the discrete spacer particles and distribution of the discrete spacer particles. See, for example, FIGS. 6*a* and 6*b*.

In another embodiment, the body including the substrate and discrete spacer particles may be sectioned or folded to create a multilayered structure. For example, the body including the substrate and discrete spacer particles may be cut into sections and then joined together to form a multilayered structure. In one embodiment, the distance between adjacent layers may be controlled by one or more aspects of the discrete spacer particles and distribution of the discrete spacer particles.

Referring again to FIG. 3, the process for forming a porous body may further include coating the body at step 307. Coating may occur at any time or multiple times during the process. For example, coating may occur prior to manipulating and/or after manipulating. According to one embodiment, some suitable non-limiting processes for coating can include dip coating, spray coating, curtain coating, and the like. In an embodiment, the coating may overly at least a portion of the surface of the porous body. In still another embodiment, the coating may overly the entirety of the surface of the porous body.

According to one aspect, the coating may include a material selected from the group of a ceramic, a glass, a metal, a metal alloy, a cermet, a polymer, or any combination thereof. In one particular embodiment, the coating may include a ceramic, such as, an oxide, a nitride, a carbide, a boride, or any combination thereof. In another embodiment, the coating may include one or more active materials as provided in the embodiments herein. In another non-limiting embodiment, the coating may consist essentially of one or more active materials as provided in the embodiments herein. According to one embodiment, the coating may include an active material or active particles. For example, the coating may include a ceramic, a glass, a fibrous material, a natural material, oxides, carbides, nitrides, halides, hydroxides, clay, polymers, metal, metal alloys or any combination thereof. Some suitable, non-limiting examples of materials for use in the coating may include activated carbon, metal organic frameworks, zeolites, boron nitride, titanium dioxide, silicon dioxide, zirconium dioxide, vanadium pentoxide, cerium oxide, lanthanum oxide, and alumina doped with platinum, palladium, rhodium, gold, silver, and other precious metals, layered double hydroxides, cordierite, lithium bayerite, ion exchange resins including but not limited to lithium titanium oxide, lithium manganese oxide, lithium iron phosphate, graphene, carbon nanotubes, manganese dioxide, manganese oxide, lanthanum strontium manganite, antimicrobial materials (e.g., anti-bacterial material, anti-fungal material, anti-viral material, or any combination thereof), or any combination thereof.

In an embodiment, the coating may include metal organic frameworks (MOFs) that may facilitate improved manufacturing and/or performance of the porous body. In an embodiment, the coating may include metal organic frameworks (MOFs) and a binder and the binder may include an organic polymer. In an embodiment, the organic polymer may include an organic cross-linked polymer. In an embodiment, the organic cross-linked polymer may include a reaction product of a water-insoluble polymer and a water-soluble polymer. In still another embodiment, the water-soluble polymer may include a polysaccharide. In an embodiment, the polysaccharide may include a cellulose derivative, or a starch derivative, an alginate, or an alginate derivative. In still another embodiment, the water-soluble polymer may include a carboxymethyl cellulose. In an embodiment, the water-insoluble polymer may include at least one polyacrylate, a polystyrene, an epoxide polymer, a polyurethane, a polyester, a polyether, a polyamide, a polyimide, or any combination or copolymer thereof. In still another embodiment, the water-insoluble polymer may include a polyacrylate, or a polystyrene, or a polyacrylate-polystyrene copolymer. In still another embodiment, the cross-linked polymeric binder may include a cross-linked polyacrylate, a cross-linked epoxide, or a cross-linked polyurethane, or a cross-linked polyimide, of a cross-linked polyamide, or any combination thereof. In an embodiment, the cross-linked polymeric binder may include a cross-linked polyacrylate. As used herein, the term "metal organic frameworks" (MOFs) relates to any compound forming a network of metal ions with coordinated organic ligands. The MOFs contained in the coating of the porous body of the present disclosure are not limited to a specific type of MOFs. The selection of the MOFs may depend on the intended use of the porous body of the present disclosure. Non-limiting examples of MOFs can be networks containing metal or transition metal ions aluminum, copper, iron, zirconium, zinc, or beryllium and organic ligands, for example, mon-ovalent, divalent, trivalent, or tetravalent organic ligands. Examples of commercial MOFs can be: Mil-100, Numat 11, Numat25, HKUST-1, UIO-66, MOF-0, MOF-2, MOF-3, MOF-4, MOF-5, MOF-6, MOF-7, MOF-8 MOF-9, MOF-11, MOF-12, MOF-20, MOF-25, MOF-26, MOF-31, MOF-32, MOF-33, MOF-34, MOF-36, MOF-37, MOF-38, MOF-39, MOF-47, MOF-49, MOF-69a, MOF-69b, MOF-74, MOF-101, MOF-102, MOF-107, MOF-108, MOF-110, MOF-177, MOF-j, MOF-n, IRMOF-1, IRMOF-2, IRMOF-3, IRMOF-4, IRMOF-5, IRMOF-6, IRMOF-7, IRMOF-8, IRMOF-9, IRMOF-10, IRMOF-11, IRMOF-12, IRMOF-13, IRMOF-14, IRMOF-15, IRMOF-16, IRMOF-17, IRMOF-18, IRMOF-19, IRMOF-20, AS16, AS27-2, AS32, AS54-3, AS61-4, AS68-7, BPR43G2, BPR48A2, BPR49B1, BPR68D10, BPR69B1, BPR73E4, BPR76D5, BPR80D5, BPR92A2, BPR95C5, UiO-67, UiO-68, NO13, NO29, N0305, NO306A, NO330, NO332, NO333, NO335, NO336, HKUST-1, or MIL101. In an embodiment, the MOF coating may be prepared according to the methods described in U.S. application Ser. No. 17/453,644 to KIDD et al.

It will be appreciated that the coating may have a par-ticular morphology that may facilitate suitable manufactur-ing and/or performance of the porous body. For example, the coating may have an average surface roughness (Ra) of at least 1 micron or at least 3 microns or at least 5 microns or at least 10 microns or at least 25 microns or at least 50 microns or at least 100 microns. In another non-limiting embodiment, the coating may have a surface roughness of not greater than 1000 cm or not greater than 500 cm or not greater than 100 cm or not greater than 75 cm or not greater than 50 cm or not greater than 10 cm or not greater than 1 cm or not greater than 800 microns or not greater than 500 microns. It will be appreciated that the coating can have an average surface roughness within a range including any of the minimum and maximum values noted above.

Any one or a combination of embodiments herein may be suitable for forming a porous body having certain properties, including for example, but not limited to a particular pres-sure drop across the porous body, a geometric surface area, a fluid path length, a Reynold's number, or a combination thereof. According to one non-limiting embodiment, the porous body may have a pressure drop of not greater than 1000 Pa for a water flow rate of 10 mg/s, such as not greater than 900 Pa, or not greater than 800 Pa, or not greater than 700 Pa, or not greater than 600 Pa, or not greater than 500 Pa, or not greater than 400 Pa, or not greater than 300 Pa. In still other embodiments, the porous body may have a pres-sure drop of at least 0.01 Pa for a water flow rate of 10 mg/s, such as at least 10 Pa, or at least 20 Pa, or at least 30 Pa, or at least 40 Pa, or at least Pa, or at least 60 Pa, or at least 70 Pa, or at least 80 Pa, or at least 90 Pa, at least 100 Pa. The porous body may have a pressure drop between any of the minimum and maximum values noted above, including for example, but not limited to, within a range of at least 0.01 Pa and not greater than 1000 Pa for a water flow rate of 10 mg/s, or within a range of at least 100 Pa and not greater than 400 Pa for a water flow rate of 10 mg/s.

In another non-limiting embodiment, the effective surface area of the porous body can be controlled to control the performance of the porous body. For example, in one instance, the porous body may have an effective surface area of at least 10,000 mm$^2$ or at least 11,000 mm$^2$ or at least 12,000 mm$^2$ or at least 13,000 mm$^2$ or at least 14,000 mm$^2$ or at least 14,500 mm$^2$, or at least 15,000 mm$^2$. In still other embodiments the porous body may have an effective surface area of not greater than 100,000 mm$^2$, such as not greater than 90,000 mm$^2$, or not greater than 80,000 mm$^2$, or not greater than 70,000 mm$^2$ or not greater than 60,000 mm$^2$ or not greater than 50,000 mm$^2$. The porous body may have an effective surface area between any of the minimum and maximum values noted above, including for example, but not limited to, within a range of 10,000 mm$^2$ and not greater than 100,000 mm$^2$, or within a range of at least 11,000 mm$^2$ and not greater than 90,000 mm$^2$. To calculate the effective surface area, a 3-D model of porous body is developed using a CAD software such as Solid Works or OnShape, and an effective surface area is given.

In another non-limiting embodiment, the water adsorption of the porous body can be controlled to control the perfor-mance of the porous body. According to one non-limiting embodiment the porous body may have a water adsorption of at least 5 mg for an air flow of not greater than 1 L/min., such as at least 6 mg or at least 7 mg or at least 8 mg or at least 9 mg or at least 10 mg or at least 11 mg or at least 12 mg or at least 13 mg or at least 14 mg or at least 15 mg or at least 16 mg. In still other embodiments, the porous body may have a water adsorption of not greater than 100 mg for an airflow of not greater than 1 L/min., such as not greater than 90 mg, or not greater than 80 mg, or not greater than 70 mg or not greater than 60 mg or not greater than 50 mg. The porous body may have water adsorption between any of the minimum and maximum values noted above, including for example, but not limited to, within a range of at least 5 mg and not greater than 100 mg for an airflow of not greater than 1 L/min., s, or within a range of at least 10 mg and not greater than 50 mg for a water flow rate of 10 mg/s.

Embodiments

Embodiment 1. A porous body comprising:

an outer tubular structure having an inner surface and an outer surface;

a first plurality of discrete spacer particles attached to the inner surface of the outer tubular structure; and a first inner tubular structure having an inner surface and an outer surface wherein the outer surface of the first inner tubular structure abuts the first plurality of dis-crete spacer particles.

Embodiment 2. A porous body comprising:

an outer tubular structure having an inner surface and an outer surface;

a plurality of inner tubular structures each having an inner surface and an outer surface; and a plurality of discrete spacer particles distributed within the porous body.

Embodiment 3. A porous body comprising:

an outer tubular structure having an inner surface and an outer surface;

a plurality of inner tubular structures each having an inner surface and an outer surface;

a plurality of discrete spacer particles distributed within the porous body; and a coating overlying at least a portion of a surface of the porous body, wherein the coating comprises metal organic frameworks (MOFs).

Embodiment 4. A porous body comprising:

an outer tubular structure having an inner surface and an outer surface;

a plurality of inner tubular structures each having an inner surface and an outer surface; and a plurality of discrete spacer particles distributed within the porous body wherein each of the plurality of discrete spacer particles comprises an active material.

Embodiment 5. A porous body comprising:

an outer tubular structure having an inner surface and an outer surface;

a plurality of inner tubular structures each having an inner surface and an outer surface;

a plurality of discrete spacer particles distributed within the porous body; and wherein the porous body comprises an active material on at least a portion of the body.

Embodiment 6. A porous body comprising:

an outer tubular structure having an inner surface and an outer surface;

a plurality of inner tubular structures each having an inner surface and an outer surface;

a plurality of discrete spacer particles distributed within the porous body wherein each of the plurality of discrete spacer particles comprises a multi-armed shape; and wherein the multi-armed shape forms a contact point with the outer tubular structure, the plurality of inner tubular structures, or a combination thereof.

Embodiment 7. A porous body comprising:

a substrate comprising a longitudinal axis along a length L of the substrate material and wherein the substrate defines a spiral shape when viewed in a plane perpendicular to the longitudinal axis; and a plurality of discrete spacer particles attached to the substrate.

Embodiment 8. A porous body comprising:

a substrate comprising a longitudinal axis along a length L of the substrate and wherein the substrate defines a spiral shape when viewed in a plane perpendicular to the longitudinal axis; and a plurality of discrete spacer particles attached to the substrate wherein each of the plurality of discrete spacer particles comprises an average solidity of at least 0.6 and not greater than 1.

Embodiment 9. A porous body comprising:

a substrate comprising a longitudinal axis along a length L of the substrate and wherein the substrate defines a spiral shape when viewed in a plane perpendicular to the longitudinal axis;

a plurality of discrete spacer particles attached to the substrate; and a coating overlying at least a portion of a surface of the porous body, wherein the coating comprises metal organic frameworks (MOFs).

Embodiment 10. A porous body comprising:

a substrate comprising a longitudinal axis along a length L of the substrate and wherein the substrate defines a spiral shape when viewed in a plane perpendicular to the longitudinal axis; and a plurality of discrete spacer particles attached to the substrate wherein each of the plurality of discrete spacer particles comprises an active material.

Embodiment 11. A porous body comprising:

a substrate comprising a longitudinal axis along a length L of the substrate and wherein the substrate defines a spiral shape when viewed in a plane perpendicular to the longitudinal axis;

a plurality of discrete spacer particles attached to the substrate; and wherein the porous body comprises an active material on at least a portion of the body.

Embodiment 12. A porous body comprising:

a substrate comprising a longitudinal axis along a length L of the substrate and wherein the substrate defines a spiral shape when viewed in a plane perpendicular to the longitudinal axis;

a plurality of discrete spacer particles attached to the substrate wherein each of the plurality of discrete spacer particles comprises a multi-armed shape; and wherein the multi-arm shape forms a contact point with the substrate.

Embodiment 13. The porous body of Embodiment 1, further comprising a second plurality of discrete spacer particles attached to an inner surface of the first inner tubular structure.

Embodiment 14. The porous body of Embodiment 13, further comprising a second inner tubular structure having an inner surface and an outer surface wherein the outer surface of the second inner tubular structure abuts the second plurality of discrete spacer particles.

Embodiment 15. The porous body of Embodiment 14, further comprising a third plurality of discrete spacer particles attached to the inner surface of the second inner tubular structure.

Embodiment 16. The porous body of Embodiment 15, further comprising a third inner tubular structure having an inner surface and an outer surface wherein the outer surface of the third inner tubular structure abuts the third plurality of discrete spacer particles.

Embodiment 17. The porous body of Embodiment 16, further comprising a fourth plurality of discrete spacer particles attached to the inner surface of the third inner tubular structure.

Embodiment 18. The porous body of Embodiment 17, wherein the fourth plurality of discrete spacer particles abuts a central structure defining central axis of the porous body.

Embodiment 19. The porous body of Embodiment 1, wherein the outer tubular structure and first inner tubular structure comprises a metal, metal alloy, ceramic, polymer, or a combination thereof.

Embodiment 20. The porous body of Embodiment 1, wherein the outer tubular structure and first inner tubular structure comprise a woven structure, a non-woven structure, or a combination thereof.

Embodiment 21. The porous body of Embodiment 1, wherein the outer tubular structure and first inner tubular structure comprise a polycrystalline phase, an amorphous material, a single-crystalline phase, or a combination thereof.

Embodiment 22. The porous body of Embodiment 14, wherein the second inner tubular structure comprises a metal, metal alloy, ceramic, polymer, or a combination thereof.

Embodiment 23. The porous body of Embodiment 16, wherein the third inner tubular structure comprises a metal, metal alloy, ceramic, polymer, or a combination thereof.

Embodiment 24. The porous body of any one of Embodiments 2, 3, 4, 5, or 6, wherein the outer tubular structure and the plurality of inner tubular structures comprises a metal, metal alloy, ceramic, polymer, or a combination thereof.

Embodiment 25. The porous body of any one of Embodiments 2, 3, 4, 5, or 6, wherein the outer tubular structure and the plurality of inner tubular structures comprises a woven structure, a non-woven structure, or a combination thereof.

Embodiment 26. The porous body of any one of Embodiments 2, 3, 4, 5, or 6, wherein the outer tubular structure and the plurality of inner tubular structures comprises a polycrystalline phase, an amorphous material, a single-crystalline phase, or a combination thereof.

Embodiment 27. The porous body of any one of Embodiments 7, 8, 9, 10, 11, or 12, wherein the substrate material comprises a metal, metal alloy, ceramic, polymer, or a combination thereof.

Embodiment 28. The porous body of any one of Embodiments 7, 8, 9, 10, 11, or 12, wherein the substrate material comprises a woven structure, a non-woven structure, or a combination thereof.

Embodiment 29. The porous body of any one of Embodiments 7, 8, 9, 10, 11, or 12, wherein the substrate material comprises a polycrystalline phase, an amorphous material, a single-crystalline phase, or a combination thereof.

Embodiment 30. The porous body of Embodiment 1, wherein the first plurality of discrete spacer particles comprises a ceramic, a glass, a metal, a metal alloy, a polymer, a natural material, a synthetic material, a fibrous material, a porous material, or a combination thereof.

Embodiment 31. The porous body of Embodiment 13, wherein the second plurality of discrete spacer particles comprises a ceramic, a glass, a metal, a metal alloy, a polymer, a natural material, a synthetic material, a fibrous material, a porous material, or a combination thereof.

Embodiment 32. The porous body of Embodiment 15, wherein the third plurality of discrete spacer particles comprises a ceramic, a glass, a metal, a metal alloy, a polymer, a natural material, a synthetic material, a fibrous material, a porous material, or a combination thereof.

Embodiment 33. The porous body of Embodiment 17, wherein the fourth plurality of discrete spacer particles comprises a ceramic, a glass, a metal, a metal alloy, a polymer, a natural material, a synthetic material, a fibrous material, a porous material, or a combination thereof.

Embodiment 34. The porous body of any one of Embodiments 2, 3, 4, 5, 6, 7, 8, 9, 10, 11, or 12, wherein the plurality of discrete spacer particles comprises a ceramic, a glass, a metal, a metal alloy, a polymer, a natural material, a synthetic material, a fibrous material, a porous material or a combination thereof.

Embodiment 35. The porous body of Embodiment 1, wherein the first plurality of discrete spacer particles comprises a regular or irregular shape.

Embodiment 36. The porous body of Embodiment 1, wherein the first plurality of discrete spacer particles comprises a regular or irregular polygonal shape.

Embodiment 37. The porous body of Embodiment 1, wherein the first plurality of discrete spacer particles comprises a multi-armed shape.

Embodiment 38. The porous body of any one of Embodiments 1, 2, 3, 4, 5, 6, 7, 8, 9, 10, 11, or 12, wherein the plurality of discrete spacer particles comprises a regular or irregular shape.

Embodiment 39. The porous body of any one of Embodiments 1, 2, 3, 4, 5, 6, 7, 8, 9, 10, 11, or 12, wherein the plurality of discrete spacer particles comprises a regular or irregular polygonal shape.

Embodiment 40. The porous body of any one of Embodiments 1, 2, 3, 4, 5, 6, 7, 8, 9, 10, 11, or 12, wherein the plurality of discrete spacer particles comprises a multi-armed shape.

Embodiment 41. The porous body of any one of Embodiments 1, 2, 3, 4, 5, 6, 7, 8, 9, 10, 11, or 12, wherein the porous body comprises a porosity of at least 0.5 or at least 0.55 or at least or at least 0.65 or at least 0.70.

Embodiment 42. The porous body of any one of Embodiments 1, 2, 3, 4, 5, 6, 7, 8, 9, 10, 11, or 12, wherein the porous body comprises a porosity of not greater than 0.9999 or not greater than 0.95 or not greater than 0.90 or not greater than 0.85 or not greater than 0.8 or not greater than 0.75.

Embodiment 43. The porous body of any one of Embodiments 1, 2, 3, 4, 5, 6, 7, 8, 9, 10 11, or 12, wherein the porous body comprises a pressure drop of at least 0.01 Pa for a water flow rate of 10 mg/s, such as at least 10 Pa, or at least 20 Pa, or at least 30 Pa, or at least 40 Pa, or at least 50 Pa, or at least 60 Pa, or at least 70 Pa, or at least 80 Pa, or at least 90 Pa, at least 100 Pa.

Embodiment 44. The porous body of any one of Embodiments 1, 2, 3, 4, 5, 6, 7, 8, 9, 10, 11, or 12, wherein the porous body comprises a pressure drop of not greater than 1000 Pa for a water flow rate of 10 mg/s, such as not greater than 900 Pa, or not greater than 800 Pa, or not greater than 700 Pa, or not greater than 600 Pa, or not greater than 500 Pa, or not greater than 400 Pa, or not greater than 300 Pa.

Embodiment 45. The porous body of any one of Embodiments 1, 2, 3, 4, 5, 6, 7, 8, 9, 10, 11, or 12, wherein the porous body comprises an effective surface area of at least 10,000 $mm^2$ or at least 11,000 $mm^2$ or at least 12,000 $mm^2$ or at least 13,000 $mm^2$ or at least 14,000 $mm^2$ or at least 14,500 $mm^2$, or at least 15,000 $mm^2$.

Embodiment 46. The porous body of any one of Embodiments 1, 2, 3, 4, 5, 6, 7, 8, 9, 10, 11, or 12, wherein the porous body comprises an effective surface area of not greater than 100,000 $mm^2$, such as not greater than 90,000 $mm^2$, or not greater than 80,000 $mm^2$, or not greater than 70,000 $mm^2$ or not greater than 60,000 $mm^2$ or not greater than 50,000 $mm^2$.

Embodiment 47. The porous body of any one of Embodiments 1, 2, 3, 4, 5, 6, 7, 8, 9, 10, 11, or 12, wherein the porous body comprises a water adsorption of at least 5mg for an air flow of not greater than 1 L/min., such as at least 6 mg, or at least 7 mg or at least 8 mg or at least 9 mg or at least 10 mg or at least 11 mg or at least 12 mg or at least 13 mg or at least 14 mg or at least 15 mg or at least 16 mg Embodiment 48. The porous body of any one of Embodiments 1, 2, 3, 4, 5, 6, 7, 8, 9, 10, 11, or 12, wherein the porous body comprises a water adsorption of not greater than 100 mg for an air flow of not greater than 1 L/min., such as not greater than 90 mg, or not greater than 80 mg, or not greater than 70 mg or not greater than 60 mg or not greater than 50 mg.

Embodiment 49. The porous body of any one of Embodiments 7, 8, 9, 10, 11, or 12, wherein the discrete spacer particles extend in a helical path along the circumferential surface of the substrate of the porous body defining a helix angle of at least 30 degrees, such as at least 31 degrees, at least 32 degrees, at least 33 degrees, at least 34 degrees, at least 35 degrees, at least 36 degrees, at least 37 degrees, at least 38 degrees, at least 39 degrees, at least 40 degrees, at least 41 degrees, at least 42 degrees, at least 43 degrees, at least 44 degrees, at least 45 degrees, at least 46 degrees, at least 47 degrees, at least 48 degrees, at least 49 degrees, at least 50 degrees, at least 51 degrees, at least 52 degrees, at least 53 degrees, at least 54 degrees, at least degrees, at least 56 degrees, at least 57 degrees, at least 58 degrees, at least 59 degrees or at least 60 degrees.

Embodiment 50. The porous body of any one of Embodiments 7, 8, 9, 10, 11, or 12, wherein the discrete spacer particles extend in a helical path along the circumferential surface of the substrate of the porous body defining a helix angle of not greater than 89 degrees, such as not greater than 88 degrees, or not greater than 87 degrees, or not greater than 86 degrees, or not greater than 85 degrees, or not greater than 84 degrees, or not greater than 83 degrees, or not greater than 82 degrees, or not greater than 81 degrees, or not greater than 80 degrees, or not greater than 79 degrees, or not greater than 78 degrees, or not greater than 77 degrees, or not greater than 76 degrees, or not greater than 75 degrees, or not greater than 74 degrees, or not greater than 73 degrees, or not greater than 72 degrees, or not greater than 71 degrees, or not greater than 70 degrees, or not greater than 69 degrees, or not greater than 68 degrees, or not greater than 67 degrees, or not greater than 66 degrees, or not greater than 65 degrees, or not greater than 64 degrees, or not greater than 63 degrees, or not greater than 62 degrees, or not greater than 61 degrees.

Embodiment 51. The porous body of Embodiment 1, wherein each discrete spacer particle of the first plurality of discrete spacer particles comprises an average solidity of at least 0.5 or at least 0.55 or at least 0.6 or at least 0.65 or at least 0.70 or at least 0.75 or at least 0.80 or at least 0.85.

Embodiment 52. The porous body of Embodiment 1, wherein each discrete spacer particle of the first plurality of discrete spacer particles comprises an average solidity of not greater than 1 or not greater than 0.9999 or not greater than 0.95 or not greater than 0.90 or not greater than 0.85.

Embodiment 53. The porous body of any one of Embodiments 2, 3, 4, 5, 6, 7, 8, 9, 10, 11, or 12, wherein each of the plurality of discrete spacer particles comprises an average solidity of not greater than 1 or not greater than 0.9999 or not greater than 0.95 or not greater than 0.90 or not greater than 0.85.

Embodiment 54. The porous body of any one of Embodiments 2, 3, 4, 5, 6, 7, 8, 9, 10, 11, or 12, wherein each of the plurality of discrete spacer particles comprises an average solidity of at least 0.5 or at least 0.55 or at least 0.6 or at least 0.65 or at least 0.70 or at least 0.75 or at least 0.80 or at least 0.85.

Embodiment 55. The porous body of any one of Embodiments 3 or 9, wherein the coating further comprises a binder, the binder including an organic polymer.

Embodiment 56. The porous body of any one of Embodiments 3 or 9, wherein the MOF comprises aluminum, copper, iron, zirconium, zinc, beryllium.

Embodiment 57. The porous body of any one of Embodiments 4, 5, 10 or 11, wherein the active material comprises a ceramic, a glass, a fibrous material, a natural material, oxides, carbides, nitrides, halides, hydroxides, clay, polymers, metal, metal alloys or any combination thereof.

Embodiment 58. The porous body of any one of Embodiments 4, 5, 10 or 11, wherein the active material comprises activated carbon, metal organic frameworks, zeolites, boron nitride, titanium dioxide, silicon dioxide, zirconium dioxide, vanadium pentoxide, cerium oxide, lanthanum oxide, and alumina doped with platinum, palladium, rhodium, gold, silver, and other precious metals, layered double hydroxides, cordierite, lithium bayerite, ion exchange resins, lithium titanium oxide, lithium manganese oxide, lithium iron phosphate, graphene, carbon nanotubes, manganese dioxide, manganese oxide, lanthanum strontium manganite, antimicrobial materials, polymers, metals, metal alloys, ceramics, glass, or any combination thereof.

Embodiment 59. The porous body of any one of Embodiments 6, 12, 37 or 40, wherein the multi-armed shape comprises a plurality of arms extending from a central portion.

Embodiment 60. The porous body of Embodiment 59, wherein the multi-armed shape forms a contact point with the outer tubular structure, the plurality of inner tubular structures, the substrate, or a combination thereof.

Embodiment 61. The porous body of any one of Embodiments 2, 3, 4, 5, 7, 8, 9, 10, or 11, wherein the plurality of discrete spacer particles form a contact point with the outer tubular structure, the plurality of inner tubular structures, or a combination thereof.

Embodiment 62. The porous body of any one of Embodiments 7, 8, 9, 10, or 11, wherein the plurality of discrete spacer particles form a contact point with the substrate.

Embodiment 63. The porous body of any one of Embodiments 6 or 61, wherein the contact point forms a continuous connection between the plurality of discrete spacer particles and the outer tubular structure, the plurality of inner tubular structures, or a combination thereof.

Embodiment 64. The porous body of any one of Embodiments 12 or 62, wherein the contact point forms a continuous connection between the plurality of discrete spacer particles and the substrate.

Embodiment 65. The porous body of any one of Embodiments 1, 2, 3, 4, 5, 6, 7, 8, 9, 10, 11, or 12, wherein the porous body comprises a crush strength of at least at least 1 N, such as at least 2 N, or at least 3 N, or at least 4 N, or at least 5 N, or at least 6 N, or at least 7 N, or at least 8 N, or at least 9 N or at least 10 N, or at least 15 N, or at least 20 N, or at least 25 N, or at least 30 N, or at least 35 N or at least 40 N, or at least 45 N, or at least 50 N.

Embodiment 66. The porous body of any one of Embodiments 1, 2, 3, 4, 5, 6, 7, 8, 9, 10, 11, or 12, wherein the porous body comprises a crush strength of not greater than 200 N, such as not greater than 180 N, or not greater than 160 N, or not greater than 140 N, or not greater than 120 N, or not greater than 100 N, or not greater than 80 N, or not greater than 605 N.

EXAMPLES

Geometry of Discrete Spacer Particles

Samples of porous bodies were formed according to an embodiment including varying geometries as described herein to determine the effect of the varying geometries on pressure drop and species consumption using a CAD model simulation using the software COMSOL Multiphysics software®. A first conventional sample porous body Cl including straight channels was formed having no discrete spacer particles included therein. A second sample porous body 51 was formed according to an embodiment having sphere shaped discrete spacer particles distributed therein. A third sample porous body S2 formed according to an embodiment having multi-armed shaped discrete spacer particles distributed therein. The samples, C1, S1, and S2 can be seen in FIGS. 14a, 14b, and 14c, respectively.

Figure 15:
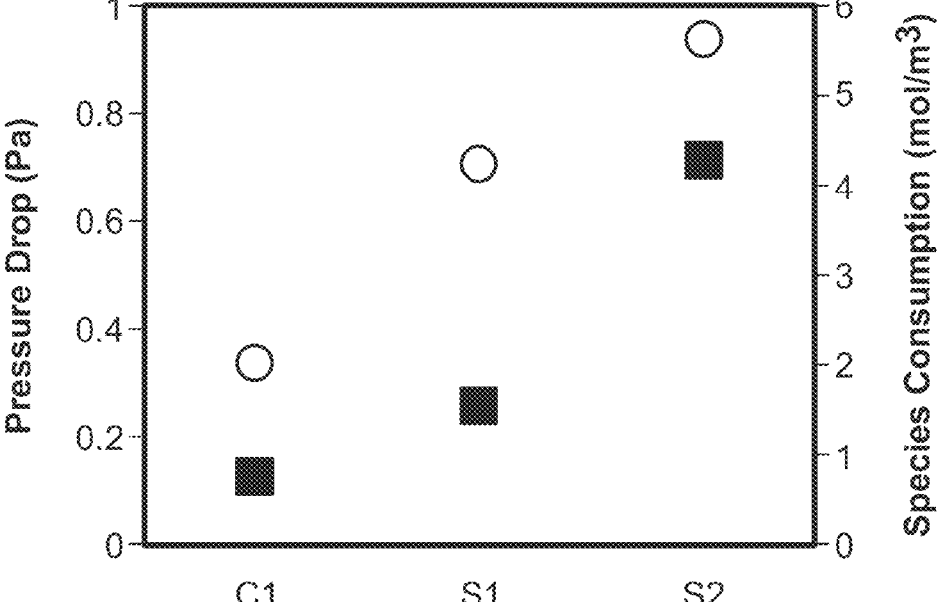
FIG. 15 includes a plot of pressure drop (Pa) and species consumption for samples C1, S1 and S2.

FIG. 15 includes a plot of pressure drop (Pa) at a water flow rate of 10 mg/s and a species consumption (mol/m³) at an inflow concentration of 10 mol/m³. The pressure drop plot is represented by the square points and the species consumption plot is represented by the circle points. Sample C1 demonstrated a low pressure drop and low species consumption while Samples S1 and S2 demonstrated an increased species consumption.

Angle of Discrete Spacer Particles

Samples of porous bodies were formed according to an embodiment including multi-armed shaped discrete spacer particles having varying helix angles as described herein to determine the effect of helix angle on pressure drop and species consumption using a CAD model simulation using the software COMSOL Multiphysics software®. Sample S3 was formed having discrete spacer particles at a zero degree helix angle. Sample S4 was formed having discrete spacer particles at a 30 degree helix angle. Sample S5 was formed having discrete spacer particles at a 60 degree helix angle.

Figure 16:
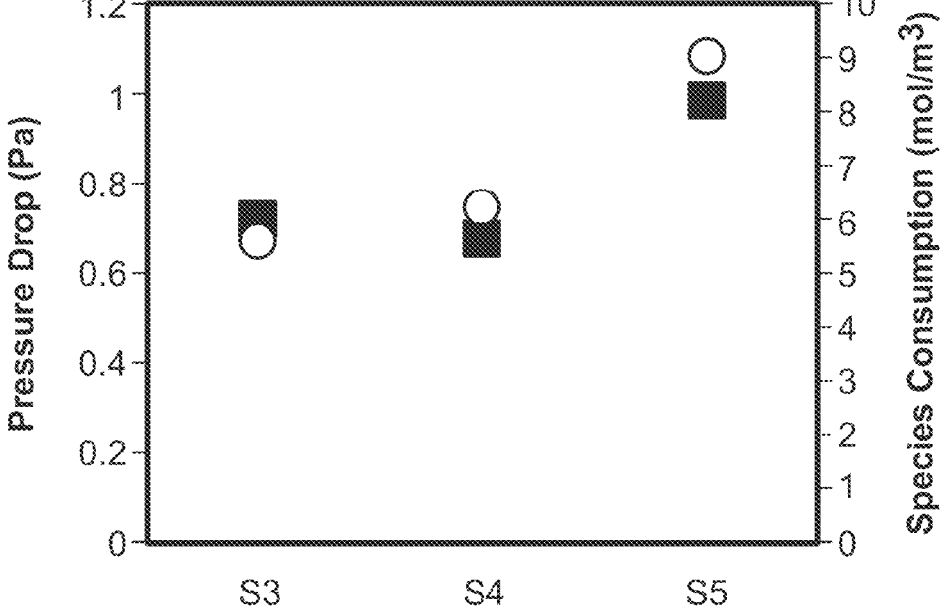
FIG. 16 includes a plot of pressure drop (Pa) and species consumption for samples S3, S4 and S5.

FIG. 16 includes a plot of pressure drop (Pa) at a water flow rate of 10 mg/s and a species consumption (mol/m$^3$) at an inflow concentration of 10 mol/m$^3$. The pressure drop plot is represented by the square points and the species consumption plot is represented by the circle points. Samples S3 and S4 demonstrated similar pressure drop and species consumptions while Sample S5 demonstrated an increased species consumption.

Porosity of Discrete Spacer Particles

Samples of porous bodies were formed according to an embodiment including multi-armed shaped discrete spacer particles having varying porosities as described herein to determine the effect of porosity on pressure drop and species consumption using a CAD model simulation using the software COMSOL Multiphysics software®. Sample S6 was formed with discrete spacer particles having a porosity of 0.5. Sample S7 was formed with discrete spacer particles having a porosity of 0.58. Sample S8 was formed with discrete spacer particles having a porosity of 0.65.

Figure 17:
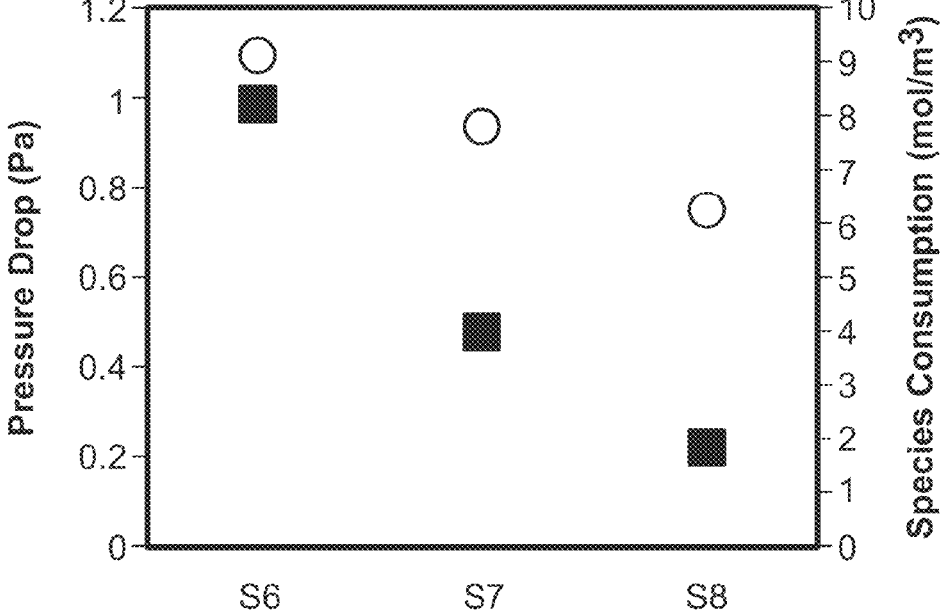
FIG. 17 includes a plot of pressure drop (Pa) and species consumption for samples S6, S7 and S8.

FIG. 17 includes a plot of pressure drop (Pa) at a water flow rate of 10 mg/s and a species consumption (mol/m$^3$) at an inflow concentration of 10 mol/m$^3$. The pressure drop plot is represented by the square points and the species consumption plot is represented by the circle points. Samples S6 and S7 demonstrated increased pressure drop when compared to Sample S8. All samples demonstrated a similar species consumption.

Figure 18:
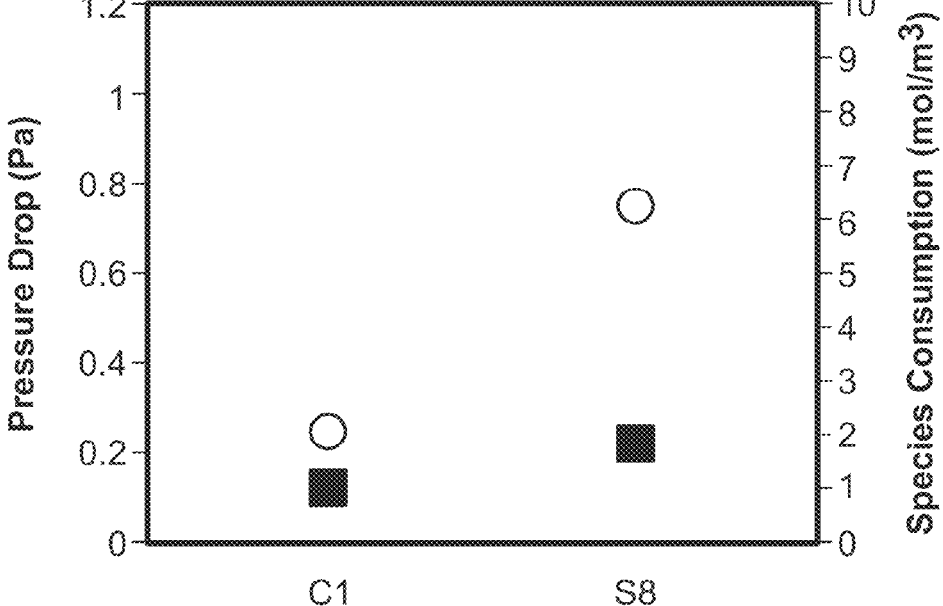
FIG. 18 includes a plot of pressure drop (Pa) and species consumption for samples Cl and S8.

FIG. 18 includes a plot of pressure drop (Pa) at a water flow rate of 10 mg/s and a species consumption (mol/m$^3$) at an inflow concentration of 10 mol/m$^3$ showing only Sample C1 and Sample S8. As shown Sample S8 having multi-armed discrete spacer particles at a 60 degree helix angle and a porosity of 0.65 demonstrated a similar pressure drop to Sample C1 and around a 3× increased species consumption.

Effective Surface Area of Porous body

The effective surface area of the Sample C1, Sample S1 and Sample S8 were measured using 3-D models of the samples using CAD Software SolidWorks. The measured effective surface area for each sample is shown in Table 1.

TABLE 1

| Sample | Effective Surface Area (mm$^2$) |
|---|---|
| C1 | 9.231 |
| S1 | 10.541 |
| S8 | 14.598 |

Water Adsorption

Figure 20:
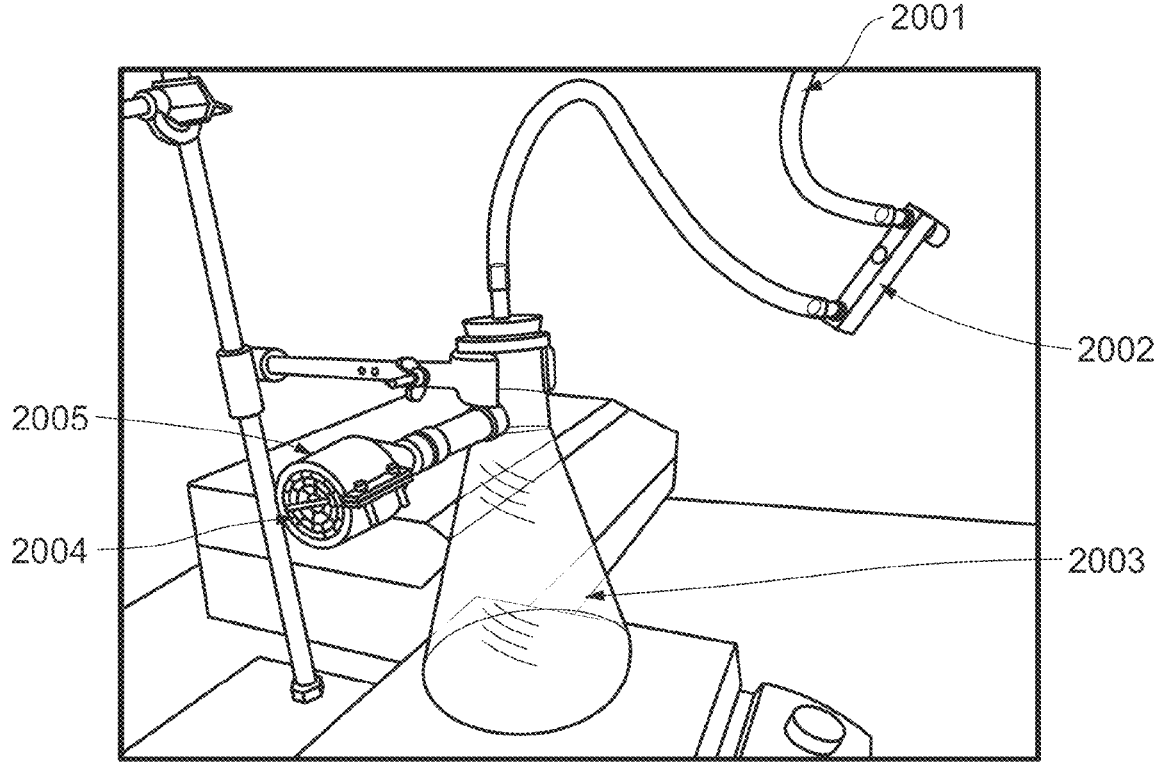
FIG. 20 includes an experimental lab set-up for measuring water adsorption of samples C1 and S9.
Figure 21:
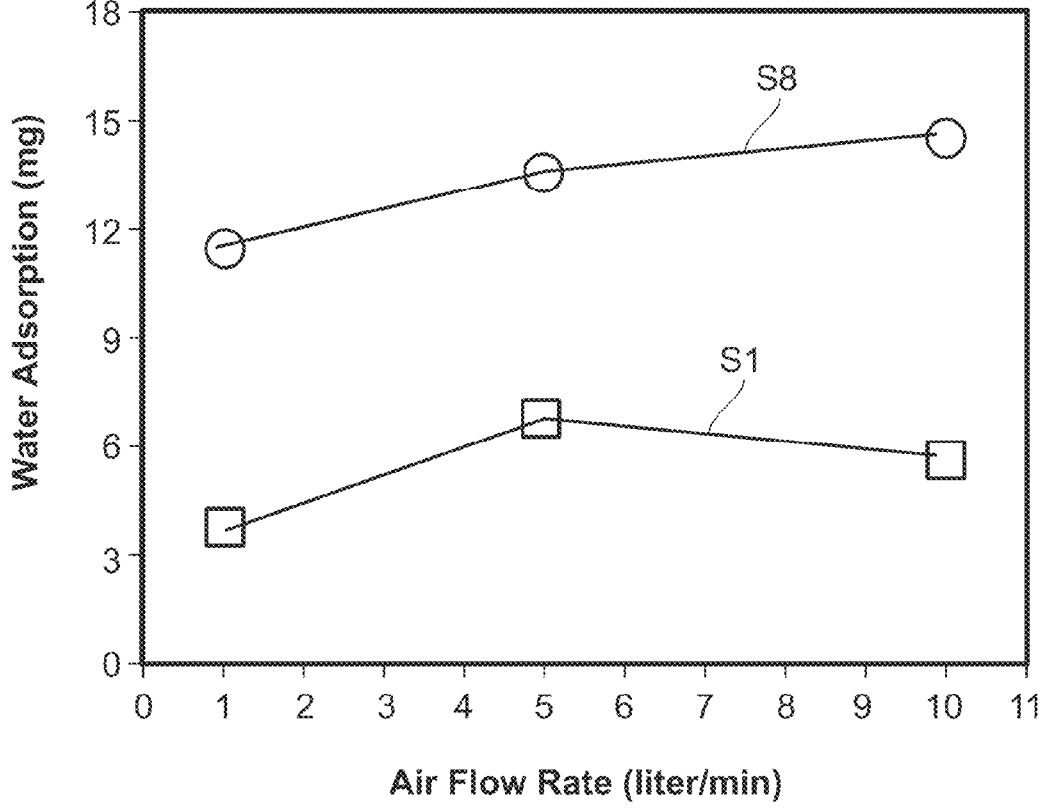
FIG. 21 includes a plot of water adsorption (mg) vs Air flow (L/min) for samples C1 and S9.

Sample S8 was dip-coated to form a coating on the porous body to form a Sample S9. The coating composition included a MOF (metal-organic framework) coating. The water adsorption for Samples C1 and S9 were then measured. FIG. 20 includes an experimental set-up used to measure the water adsorption of the samples. The set-up includes Air Flow hose 2001, flow rate controller 2002, an Erlenmeyer flask 2003, porous body 2004 and a 3-D printed chamber 2005 for holding the porous body. For each measurement, a sample was placed into the 3-D printed chamber 2005, about 200 mL of water was placed into flask 2003, the water was brought to a boil at 100° C. and the air-flow was started. The water adsorption was measured for each sample across varying air-flow rates. The results can be seen in FIG. 21. As shown, sample S9 demonstrated an increased water adsorption when compared to C1.

Pressure Drop

Figure 19:
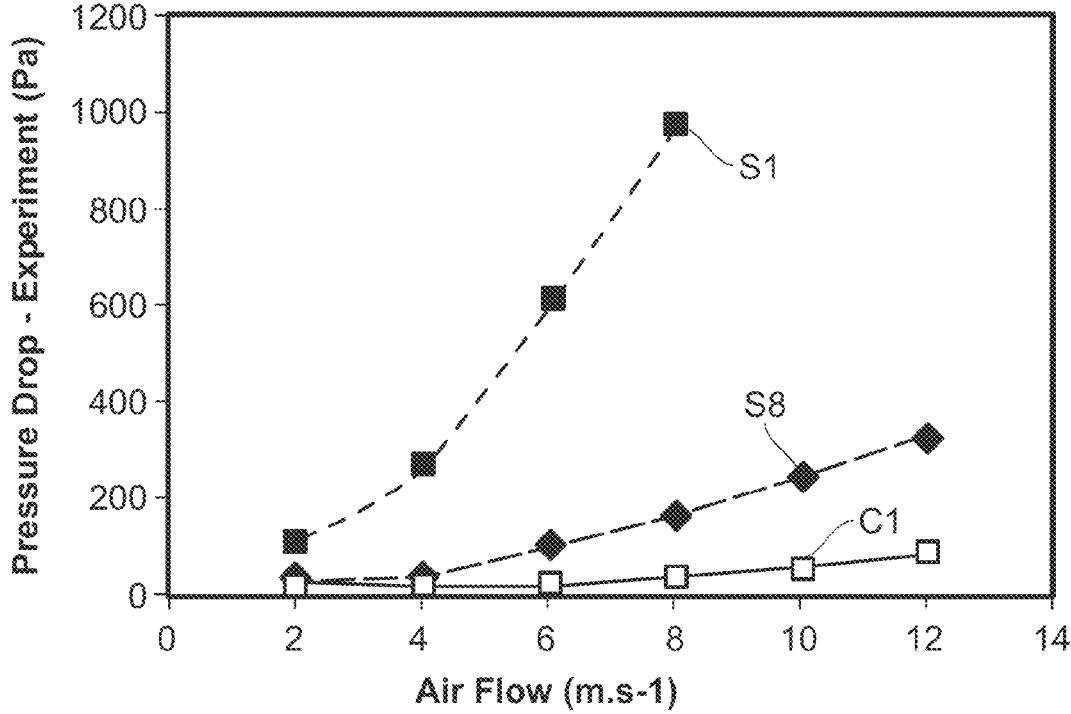
FIG. 19 includes a plot of pressure drop (Pa) vs Air flow (m.s-1) for samples Cl, S1 and S8.
Figure 22:
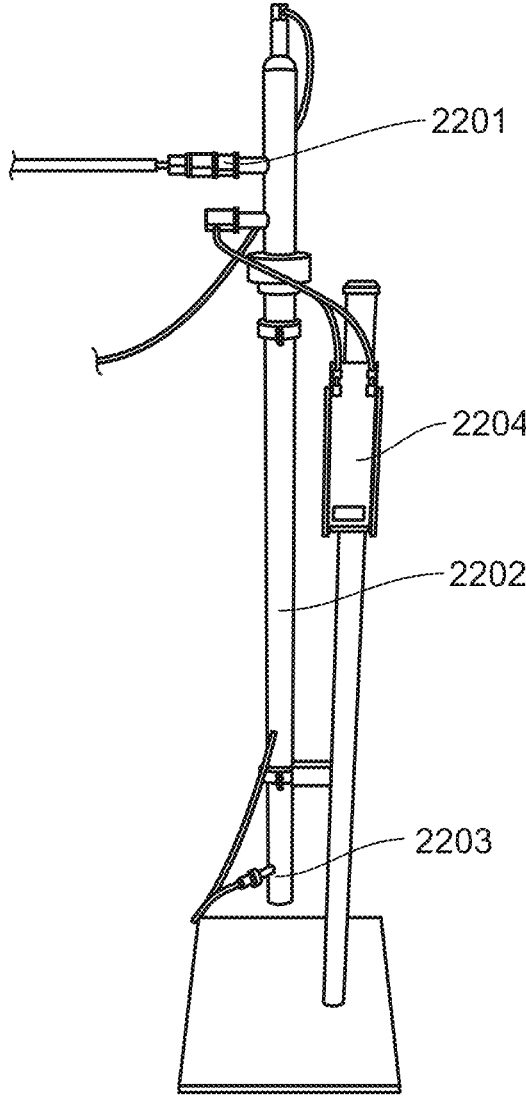
FIG. 22 includes an experimental lab set-up for measuring pressure drop of samples C1, S1 and S9.

The pressure drop was measured in lab for Samples C1, S1, and S9. FIG. 22 includes an experimental set-up used to measure the pressure drop of the samples. The set-up includes an anemometer 2201, a 1 in diameter stainless steel tube 2202, airflow hose 2203, and water-filled manometer 2204. For each measurement, a sample was placed into the stainless steel tube with a seal around the sample to ensure air flow is forced to pass through the sample. Air flow was then started through the stainless steel tube and a water-filled manometer was used to measure the pressure drop across varying air-flow rates. FIG. 19 includes a plot of pressure drop (Pa) versus Air flow (m.s-1) for samples C1, S1 and S9. As shown, Sample S9 and C1 have similar pressure drop trends while sample S1 demonstrated an increased pressure drop with increased air flow.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A porous body comprising:
an outer tubular structure having an inner surface and an outer surface;
a first plurality of discrete spacer particles attached to the inner surface of the outer tubular structure; and
a first inner tubular structure having an inner surface and an outer surface wherein the outer surface of the first inner tubular structure abuts the first plurality of discrete spacer particles.

2. The porous body of claim 1, wherein the first plurality of discrete spacer particles comprises a multi-armed shape.

3. The porous body of claim 1, wherein the first plurality of discrete spacer particles comprises a regular or irregular polygonal shape.

4. The porous body of claim 1, wherein the porous body comprises a porosity of at least 0.5 and not greater than 0.99.

5. The porous body of claim 1, wherein the first plurality of discrete spacer particles extends in a helical path along the circumferential surface of the first inner tubular structure of the porous body defining a helix angle of at least 30 degrees and not greater than 89 degrees.

6. The porous body of claim 1, further comprising a second plurality of discrete spacer particles attached to an inner surface of the first inner tubular structure.

7. The porous body of claim 6, further comprising a second inner tubular structure having an inner surface and an outer surface wherein the outer surface of the second inner tubular structure abuts the second plurality of discrete spacer particles.

8. A porous body comprising:

a substrate comprising a longitudinal axis along a length L of the substrate material and wherein the substrate defines a spiral shape when viewed in a plane perpendicular to the longitudinal axis; and a plurality of discrete spacer particles attached to the substrate.

9. The porous body of claim 8, wherein each of the plurality of discrete spacer particles comprises an average solidity of at least 0.5 and not greater than 1.

10. The porous body of claim 8, wherein the plurality of discrete spacer particles comprises an active material, and wherein the active material comprises activated carbon, metal organic frameworks, zeolites, boron nitride, titanium dioxide, silicon dioxide, zirconium dioxide, vanadium pentoxide, cerium oxide, lanthanum oxide, and alumina doped with platinum, palladium, rhodium, gold, silver, and other precious metals, layered double hydroxides, cordierite, lithium bayerite, ion exchange resins, lithium titanium oxide, lithium manganese oxide, lithium iron phosphate, graphene, carbon nanotubes, manganese dioxide, manganese oxide, lanthanum strontium manganite, antimicrobial materials, polymers, metals, metal alloys, ceramics, glass, or any combination thereof.

11. The porous body of claim 8, wherein the porous body comprises a coating overlying at least a portion of a surface of the porous body.

12. The porous body of claim 11, wherein the coating comprises metal organic frameworks (MOFs).

13. The e porous body of claim 12, wherein the coating further comprises a binder, the binder comprising an organic polymer.

14. A porous body comprising:

a substrate comprising a longitudinal axis along a length L of the substrate and wherein the substrate defines a spiral shape when viewed in a plane perpendicular to the longitudinal axis;

a plurality of discrete spacer particles attached to the substrate wherein each of the plurality of discrete spacer particles comprises a multi-armed shape; and wherein the multi-arm shape forms a contact point with the substrate.

15. The porous body of claim 14, wherein the contact point forms a continuous connection between the plurality of discrete spacer particles and the substrate.

16. The porous body of claim 14, wherein the multi-armed shape comprises a plurality of arms extending from a central portion.

17. The porous body of claim 14, wherein the porous body comprises a porosity of at least 0.5 and not greater than 0.9999.

18. The porous body of claim 14, wherein the plurality of discrete spacer particles extends in a helical path along the circumferential surface of the substrate defining a helix angle of at least 30 degrees and not greater than 89 degrees.

19. The porous body of claim 14, wherein the coating comprises metal organic frameworks (MOFs).

20. The porous body of claim 19, wherein the coating further comprises a binder, the binder comprising an organic polymer.

* * * * *